(12) United States Patent
Hirano

(10) Patent No.: US 6,836,970 B2
(45) Date of Patent: Jan. 4, 2005

(54) WHEEL ALIGNMENT MEASURING METHOD AND APPARATUS

(75) Inventor: Akira Hirano, Sayama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/416,906

(22) PCT Filed: Dec. 10, 2001

(86) PCT No.: PCT/JP01/10776
§ 371 (c)(1),
(2), (4) Date: Oct. 29, 2003

(87) PCT Pub. No.: WO02/48643
PCT Pub. Date: Jun. 20, 2002

(65) Prior Publication Data
US 2004/0055169 A1 Mar. 25, 2004

(30) Foreign Application Priority Data
Dec. 13, 2000 (JP) ............... 2000-379399

(51) Int. Cl.$^7$ .................. G01B 5/255; G01B 11/26
(52) U.S. Cl. .......................... 33/203; 33/203.15
(58) Field of Search ................ 33/203, 203.15, 33/203.16, 203.17, 203.21; 29/464, 468

(56) References Cited

U.S. PATENT DOCUMENTS

| | | | |
|---|---|---|---|
| 3,546,782 A | * 12/1970 | Wertheimer et al. | 33/203.17 |
| 4,109,387 A | 8/1978 | Matsuoka et al. | 33/608 |
| 4,429,467 A | * 2/1984 | Murata et al. | 33/203 |
| 4,457,075 A | * 7/1984 | Murata | 33/203.15 |
| 4,901,442 A | * 2/1990 | Fujii | 33/203.15 |
| 5,125,298 A | 6/1992 | Smith | 81/57.37 |
| 5,268,731 A | * 12/1993 | Fuchiwaki et al. | 33/203.15 |
| 5,345,675 A | 9/1994 | Yamanaka et al. | 29/894.3 |
| 5,600,435 A | * 2/1997 | Bartko et al. | 33/203.16 |
| 5,818,574 A | * 10/1998 | Jones et al. | 33/203.16 |
| 6,545,750 B2 | * 4/2003 | Roth et al. | 33/203.16 |

FOREIGN PATENT DOCUMENTS

| | | |
|---|---|---|
| EP | 0 407 211 A2 | 1/1991 |
| JP | 3-26767 | 1/1985 |

* cited by examiner

Primary Examiner—Christopher W. Fulton
(74) Attorney, Agent, or Firm—Merchant & Gould P.C.

(57) ABSTRACT

A method and apparatus for measuring the wheel alignment of a vehicle on a production line. In the measuring method, a wheel hub (55) having a plurality of hub bolts (56) for mounting a wheel to is rotated while displacements of the hub bolts are measured with measuring sensors (73, 74). The wheel alignment is measured by calculating an angle of inclination (θ) of the wheel hub on the basis of the measured displacements of the hub bolts.

5 Claims, 17 Drawing Sheets

FIG.13

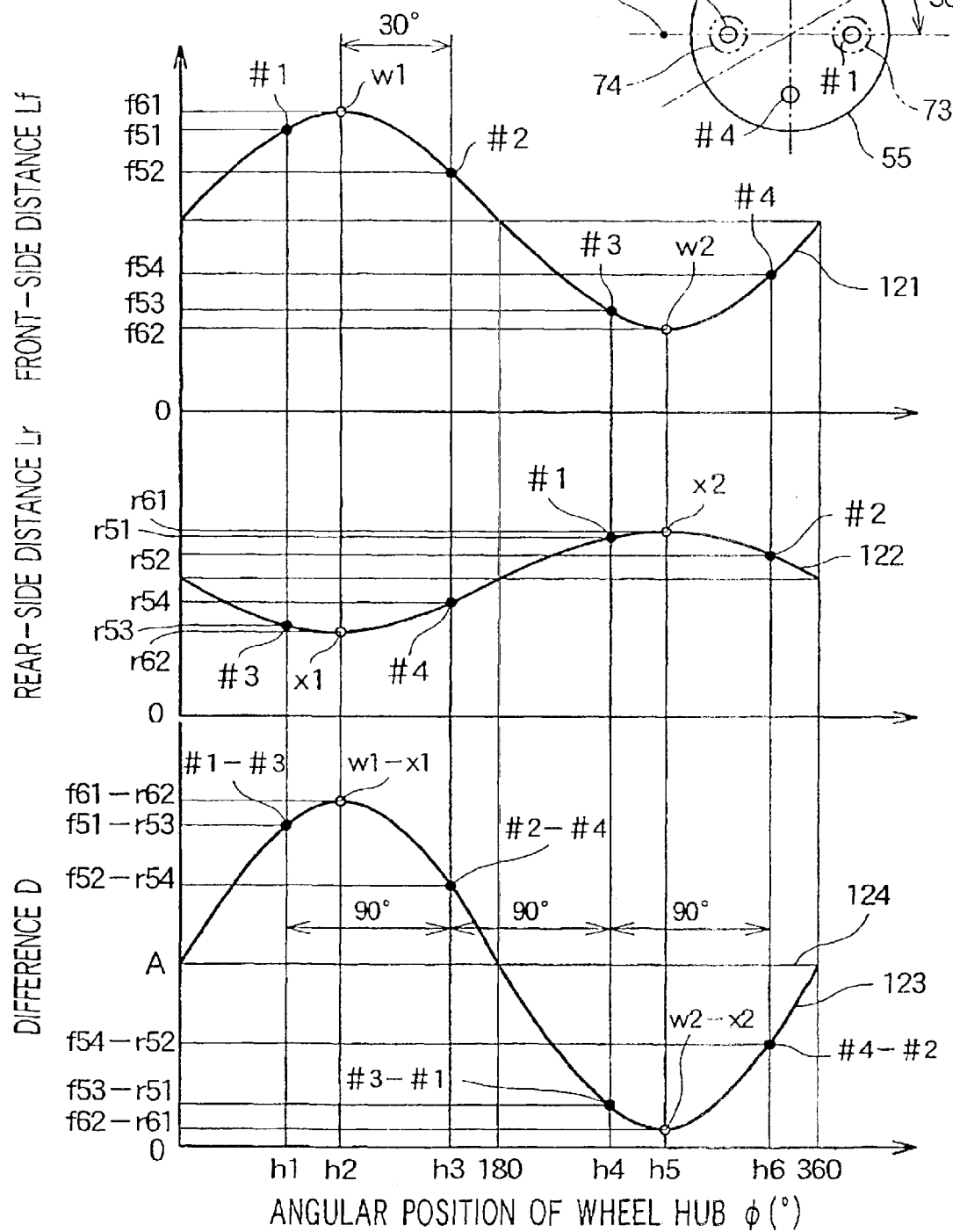

WHEEL ALIGNMENT MEASURING METHOD AND APPARATUS

TECHNICAL FIELD

This invention relates to a method and an apparatus for measuring the wheel alignment of a vehicle on a production line.

BACKGROUND ART

Wheel alignment in a vehicle, expressed for example as toe-in and camber angle, is an important factor affecting the straight-line stability, cornering characteristics and steering characteristics of the vehicle. The toe-in aspect of wheel alignment will now be explained, on the basis of FIGS. 20A through 20C hereof.

Toe-in refers to inclining inward of the front part of a wheel 200 as shown in FIG. 20B, or the degree of that inclining inward, from the state shown in FIG. 20A wherein the wheel 200 points in the forward direction of the vehicle. This toe-in is generally obtained by statically measuring the inclination angle (this inclination angle is called the toe angle) $\theta$ of the wheel 200. An apparatus which uses this kind of measuring method is disclosed in, for example, Japanese Patent Publication No. HEI-3-26767, "Vehicle Wheel Inclination Angle Measuring Apparatus". With this apparatus the wheel is sandwiched between detection plates, and toe-in and camber angle are measured by detecting displacements of these detection plates from reference positions with a plurality of sensors.

However, with the measuring method disclosed in Japanese Patent Publication No. HEI-3-26767, the inclination angles of the wheel are measured on a vehicle which has been completed on a production line, and because the measurement is carried out along with other checks at the end of the production line; the number of items to be checked is large and the flow of the line may be held up.

Also, it is necessary for the wheel to be positioned precisely in the measuring position between the two detection plates, and the measurement entails a lot of labor.

Furthermore, for example with a wheel fitted with a tire having raised letters formed on its side faces, when these raised parts are sandwiched between the two detection plates, an error arises in the wheel inclination angle measurement result, and the measurement accuracy suffers.

Moreover, with this inclination angle measuring apparatus, to sandwich the wheel with the two detection plates, respective stays for supporting each of these detection plates and a linkage mechanism for moving the detection plates in synchrony and so on are necessary, and there are a large number of parts and the apparatus itself is complicated.

And in FIG. 20B, depending on the manufacturing accuracy of a wheel hub to which the wheel 200 is attached and a wheel shaft rotatably supporting the wheel hub, when the wheel 200 is rotated, the wheel 200 may oscillate from left to right about the position at which it is inclined through the angle $\theta$. These left and right oscillation angles will be written as $+\alpha$ and $-\alpha$.

FIG. 20C is a graph showing change of the toe angle occurring when the wheel 200 is rotated. The vertical axis shows the toe angle T and the horizontal axis shows time t. According to this graph, the toe angle T changes sinusoidally with time t, and the maximum value of the toe angle T is $\theta+\alpha$ and its minimum value is $\theta-\alpha$. So for example in FIG. 20B, if the inclination of the wheel 200 is measured statically with the wheel 200 inclined through an angle $(\theta+\alpha)$ with respect to the vehicle forward direction, an error of angle $\alpha$ will arise.

DISCLOSURE OF THE INVENTION

It is therefore a first object of the invention to provide a wheel alignment measuring method which can smooth the flow of a production line, simplify measurement, and raise measurement accuracy.

It is a second object of the invention to provide a wheel alignment measuring apparatus with a reduced number of parts and a simplified construction.

To achieve these objects and other objects, a first aspect of the invention provides a method for measuring wheel alignment including: a step of rotating a wheel hub having projecting from it a plurality of hub bolts for fitting a wheel on; a step of measuring displacements of the tips of the hub bolts directly or indirectly with at least two displacement measuring devices disposed in positions away from the hub bolts; a step of calculating an inclination angle of the wheel hub on the basis of the displacements measured with the displacement measuring devices; and a step of measuring the wheel alignment before a wheel is fitted to the wheel hub on the basis of the calculated inclination angle of the wheel hub.

With this invention, because it is possible to measure the wheel alignment like this before the wheel is fitted to the wheel hub, for example while the vehicle is moving along a production line the alignment of a plurality of wheels can be measured from the sides of the vehicle, without stopping the manufacturing flow of the vehicle, and the productivity of manufacture of the vehicle can be improved. Also, because it is just a matter of for example measuring the displacements of hub bolts, the measurement can be carried out simply and a reduction in measurement labor can be achieved. Because the wheel hub is rotated while the displacements of the hub bolts are measured, wheel hub inclination errors caused by dispersion in the lengths of the hub bolts can be canceled out, and the wheel alignment measurement accuracy can be increased.

The displacements of the tips of the hub bolts can be measured indirectly by placing a disc against the tips of the hub bolts and rotating this disc integrally with the wheel hub and measuring displacements of the side face of the disc. In this case, because it is just a matter of pressing a disc against the hub bolts, the measurement can be carried out easily, and a reduction in measurement labor can be achieved.

In a particular embodiment of a method according to the invention, the displacement measuring devices are made to face the tips of the hub bolts and the displacements of the tips of the hub bolts are measured directly. And because the measurement is then a just matter of directly measuring displacements of the tips of the hub bolts, the measurement can be carried out simply and a reduction in measurement labor can be achieved.

A second aspect of the invention provides a wheel alignment measuring apparatus for measuring a wheel alignment before a wheel is fitted to a wheel hub on a vehicle body, having: a disc to be pressed against the tips of a plurality of wheel-mounting hub bolts provided on the wheel hub; a disc rotating device for rotating the disc integrally with the wheel hub; a plurality of displacement measuring devices for measuring displacements of a side face of the disc occurring when the disc is rotated; and an inclination angle calculating device for calculating an inclination angle of the wheel hub on the basis of displacement signals from the displacement measuring devices.

Because the apparatus of this aspect of the invention is constructed to measure displacements of a side face of a disc with displacement measuring devices without a wheel being fitted to the wheel hub like this, the construction of the apparatus can be made simple and the displacement measuring devices can be disposed freely anywhere alongside the disc.

A third aspect of the invention provides a wheel alignment measuring apparatus for measuring a wheel alignment before a wheel is fitted to a wheel hub on a vehicle body, having: a wheel hub rotating device for rotating the wheel hub; a plurality of displacement measuring devices, disposed so as to face the tips of wheel-mounting hub bolts provided on the wheel hub, for measuring displacements of the tips of the hub bolts occurring when the wheel hub is rotated; and an inclination angle calculating device for calculating an inclination angle of the wheel hub on the basis of displacement signals from the displacement measuring devices.

Because this measuring apparatus is constructed to measure the wheel alignment without a wheel being fitted to the wheel hub, and furthermore to measure displacements of the hub bolts directly, the number of parts in the wheel alignment measuring apparatus can be reduced, its construction can be made simple, and the manufacturing cost and maintenance cost of the wheel alignment measuring apparatus can be kept down.

BRIEF DESCRIPTION OF THE DRAWINGS

FIGS. 7A and 7B are schematic views for obtaining toe-in;

FIG. 13 is a side view of a wheel alignment measuring apparatus according to a second embodiment of the invention;

FIG. 19 is a graph showing changes in front-side and rear-side distances and the difference between these distances with respect to the angular position of the wheel hub.

BEST MODE FOR CARRYING OUT THE INVENTION

A number of embodiments of the invention will now be described in detail with reference to the accompanying drawings.

Figure 1:
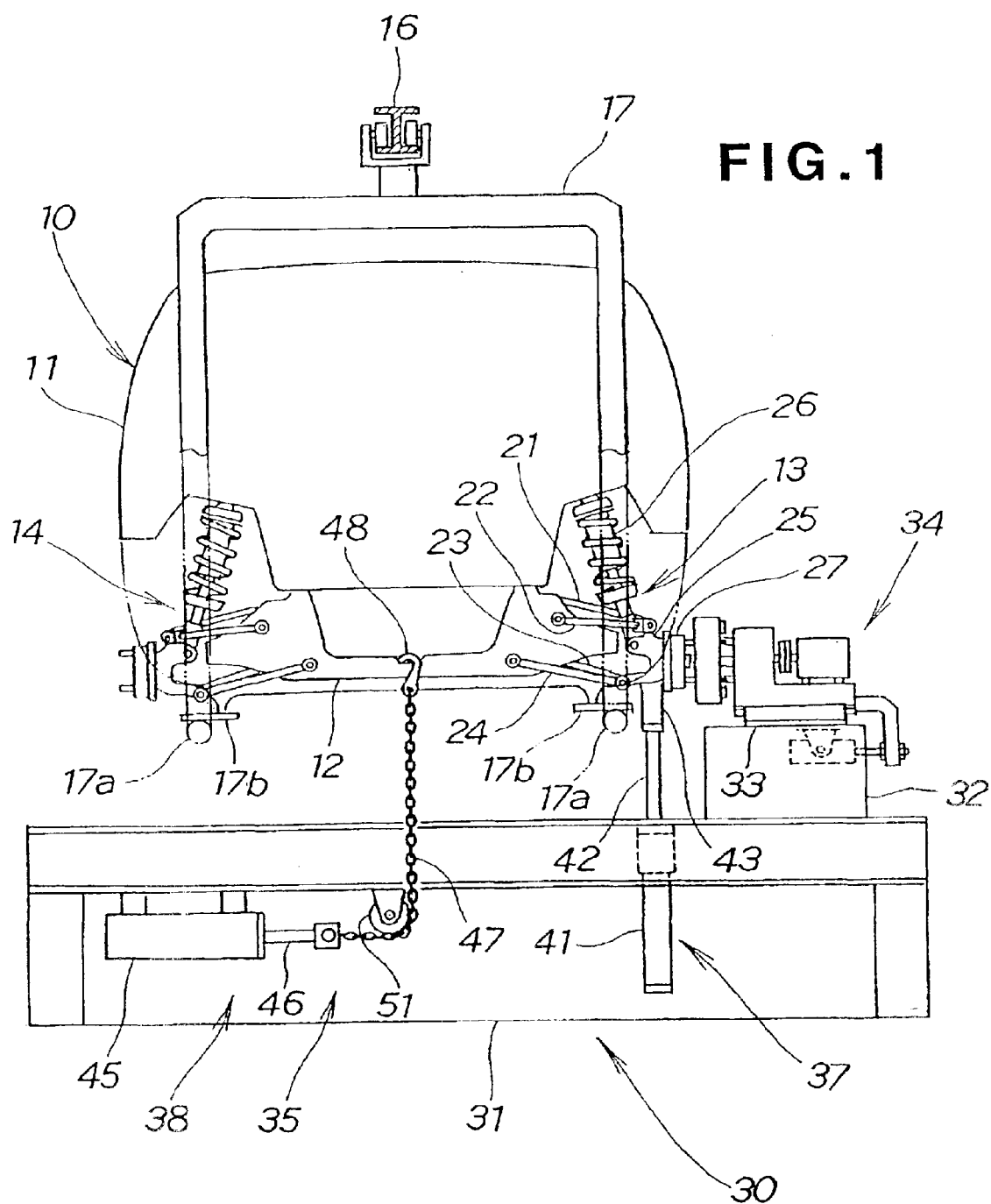
FIG. 1 is a view of a vehicle being supported against a wheel alignment measuring apparatus according to a first embodiment of the invention.

FIG. 1 shows a wheel alignment measuring apparatus according to a first embodiment of the invention installed on a vehicle production line.

A vehicle 10 has a body 11, a sub-frame 12 attached to the bottom of this body 11 and extending in the width direction of the vehicle, and a pair of suspension assemblies 13, 14 attached to the body 11 and the sub-frame 12. The vehicle 10 is suspended from a hanger 17 movably attached to a conveyor rail 16 of a production line. The reference numerals 17a, 17a denote hanger ends and 17b, 17b support plates attached to the hanger ends 17a, 17a for supporting the bottom of the body 11.

The suspension assembly 13 is made up of multiple suspension arms 21, 22, 23 and 24 extending outward from the sub-frame 12 and movable up and down; a knuckle 25 attached to the ends of the suspension arms 21, 22, 23 and 24; a wheel hub (not shown; further discussed later) rotatably attached to this knuckle 25; and a suspension strut 26 extending between the knuckle 25 and the body 11. The reference number 27 denotes a drum brake mounted on the knuckle 25. The suspension assembly 14 is constructed left-right symmetrically with the suspension assembly 13 against the body 11 and the sub-frame 12 and will not be described in detail here.

A wheel alignment measuring apparatus 30 is made up of a base part 31 disposed on a floor below the conveyor rail 16; a plinth 32 mounted on this base part 31; an alignment measuring part 34 mounted on this plinth 32 by way of a rail 33, movably in the direction of the width of the vehicle 10; and a suspension positioning mechanism 35, mounted on the base part 31, for positioning the suspension assembly 13 in a predetermined state for wheel alignment measurement.

The suspension positioning mechanism 35 is made up of a first cylinder device 37 for pushing up the suspension assembly 13 and a second cylinder device 38 for pulling down the sub-frame 12.

The first cylinder device 37 is made up of a cylinder 41; a piston rod 42 attached to a piston (not shown) movably fitted in this cylinder 41; and a suspension supporting part 43, attached to the end of the piston rod 42, for supporting for example the knuckle 25 of the suspension assembly 13.

The second cylinder device 38 is made up of a cylinder 45; a piston rod 46 attached to a piston (not shown) movably fitted in this cylinder 45; a chain 47 extending from the end of the piston rod 46 to the sub-frame 12 side; and a hook 48 attached to the end of the chain 47 and hooked onto the sub-frame 12. The reference number 51 denotes a guide pulley for guiding the chain 47.

Figure 2:
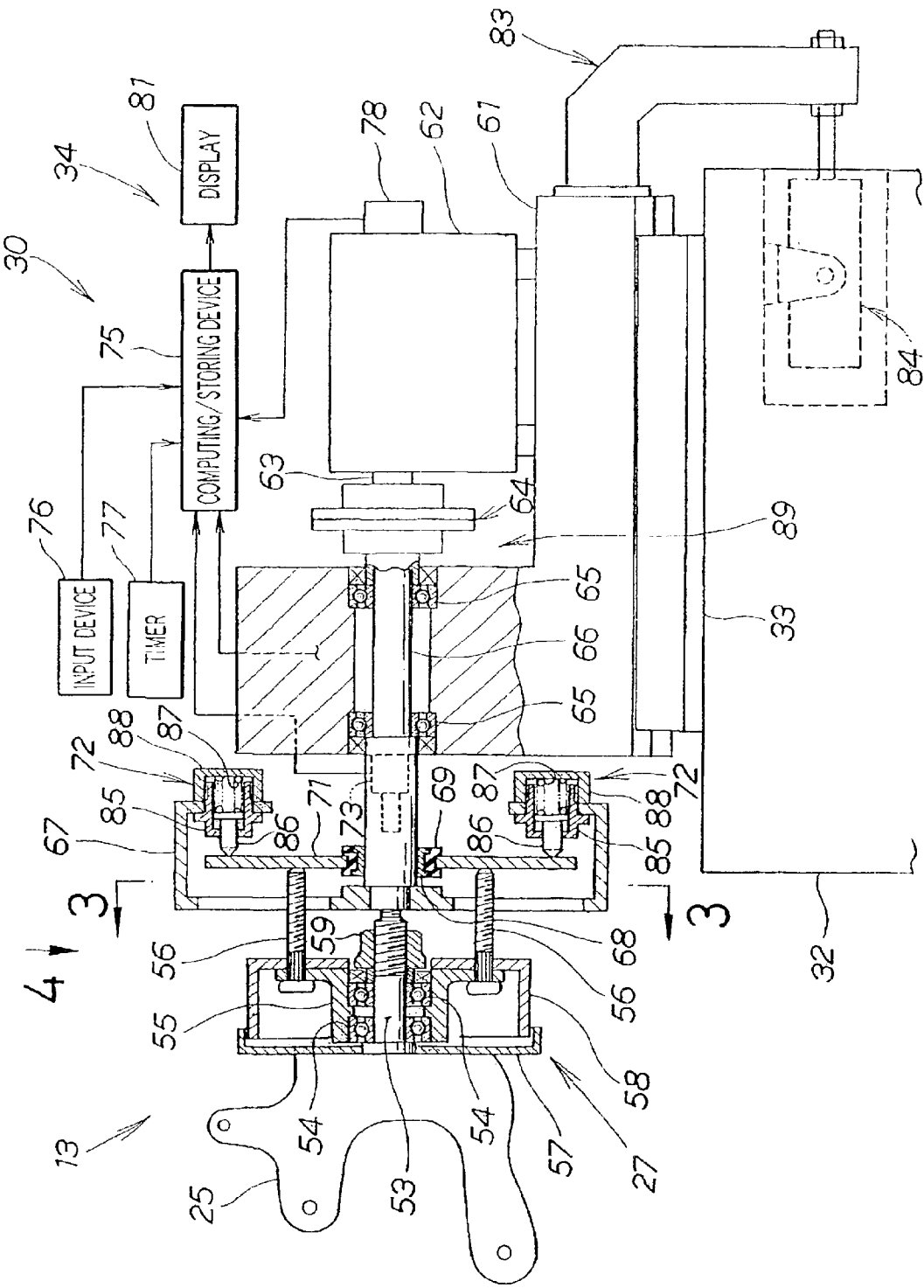
FIG. 2 is a partial sectional view of the same wheel alignment measuring apparatus.

FIG. 2 is a partially sectional side view of the alignment measuring part 34 of the wheel alignment measuring apparatus 30. The alignment measuring part 34 is set against the suspension assembly 13 and measures the wheel alignment.

By way of bearings 54, 54 the suspension assembly 13 rotatably supports a wheel hub 55 on a wheel axle 53 mounted on the knuckle 25, and a plurality of hub bolts 56 for fitting a wheel to are provided on this wheel hub 55. The reference numbers 57 and 58 respectively denote a back plate and a brake drum constituting the drum brake 27. The reference number 59 denotes a nut fastening the wheel hub 55 to the wheel axle 53.

The alignment measuring part 34 has a sectionally L-shaped base part 61. An electric motor 62 is mounted on this base part 61. The output shaft 63 of this electric motor 62 is connected by way of a coupling 64 to a shaft 66. The shaft 66 is rotatably supported on the base part 61 by bearings 65, 65. A wheel hub driving member 67 for rotating the wheel hub 55 on the suspension assembly 13 is attached to the end of the shaft 66. A disc 71 is fitted to the shaft 66 by way of a bush 68 and a rubber 69. Pressing mechanisms 72 for pressing the disc 71 so that a side face of the disc 71 makes contact with the tips of the hub bolts 56 are mounted on the wheel hub driving member 67. A front-side displacement sensor 73 and a rear-side displacement sensor 74 shown in FIG. 4 serving as displacement measuring devices are mounted on the base part 61. These displacement sensors 73, 74 detect displacements of the side face of the disc 71 occurring when the disc 71 rotates. A computing/storing device 75 serving as an inclination angle calculating device calculates a wheel alignment on the basis of displacement signals from the displacement sensors 73, 74 and stores the result of the calculation. An input device 76 inputs data to the computing/storing device 75. The reference number 77 denotes a timer. The reference number 78 denotes a speed-detecting sensor for detecting the speed of the output shaft 63 of the electric motor 62 and supplying a corresponding speed signal to the computing/storing device 75. The calculation result obtained in the computing/storing device 75 is displayed on a display 81. The reference numeral 83 denotes an alignment measuring part moving device having a third cylinder 84 for moving the alignment measuring part 34 in the left-right direction of the figure.

The pressing mechanisms 72 are each made up of a case 85; a disc pressing member 86 movably fitted inside this case 85 and having its end projecting through a hole provided in the bottom of the case 85; a spring 87 pressing the disc pressing member 86 against the disc 71; and a cap member 88 for supporting a base end of this spring 87 and fixing the pressing mechanism 72 to the wheel hub driving member 67 by being screwed onto a male thread provided on the case 85.

The front-side displacement sensor 73 and the rear-side displacement sensor 74 are noncontact-type sensors using light, sound waves or electromagnetic waves.

The base part 61, the electric motor 62, the output shaft 63, the coupling 64, the bearings 65, the shaft 66 and the wheel hub driving member 67 constitute a disc rotating mechanism 89 for rotating the disc 71.

Figure 3:
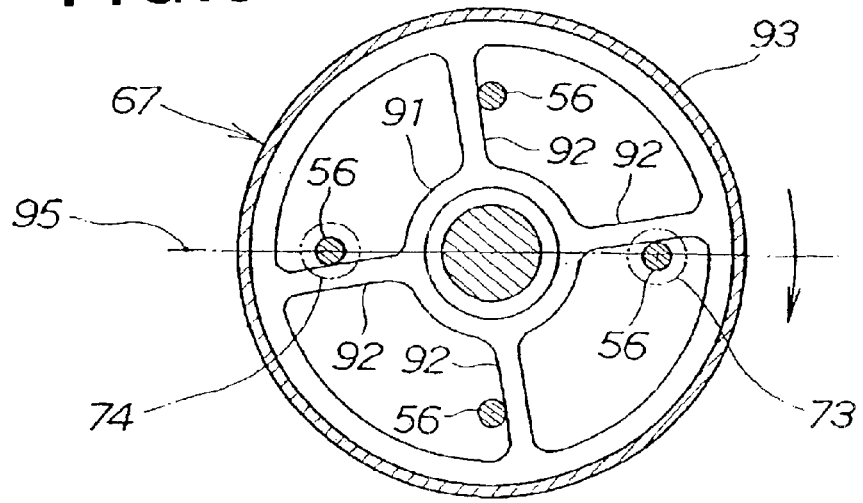
FIG. 3 is a sectional view taken along line 3—3 in FIG. 2.

Referring now to FIG. 3, the wheel hub driving member 67 is made up of a boss part 91, a plurality of spoke parts 92 extending radially from this boss part 91, and a circumferential part 93 connecting the ends of these spoke parts 92. By the spoke parts 92 abutting with the sides of the hub bolts 56, rotation of the wheel hub driving member 67 is transmitted to the wheel hub 55 shown in FIG. 2. The displacement sensors 73, 74 are both disposed on the same horizontal line 95.

Figure 4:
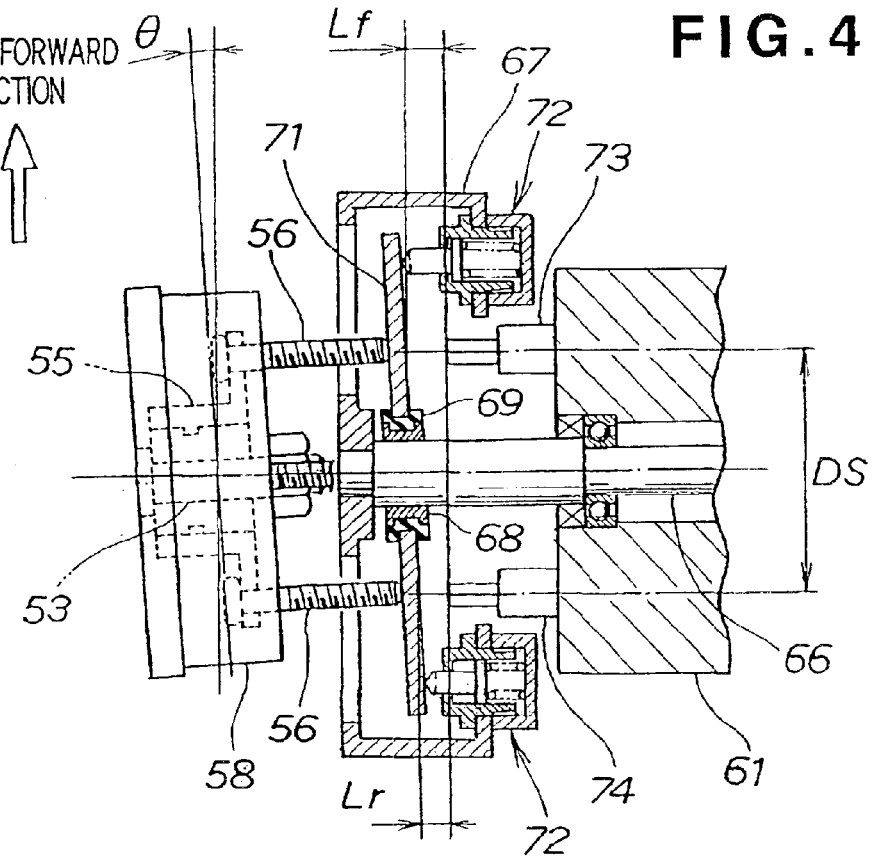
FIG. 4 is a sectional view in the direction of arrow 4 in FIG. 2.

When the disc 71 is inclined with respect to the length-direction axis of the vehicle, as shown in FIG. 4, if the distance from the front-side displacement sensor 73 to the side face of the disc 71 is written Lf and the distance from the rear-side displacement sensor 74 to the side face of the disc 71 is written Lr and the distance between the front-side displacement sensor 73 and the rear-side displacement sensor 74 is written DS, then the angle of inclination θ of the wheel hub 55 with respect to the vehicle length direction (which angle θ becomes the toe angle of the wheel when a wheel is subsequently fitted) can be obtained by measuring the distances Lf and Lr while rotating the disc 71 (this will be discussed in detail later).

Figure 5:
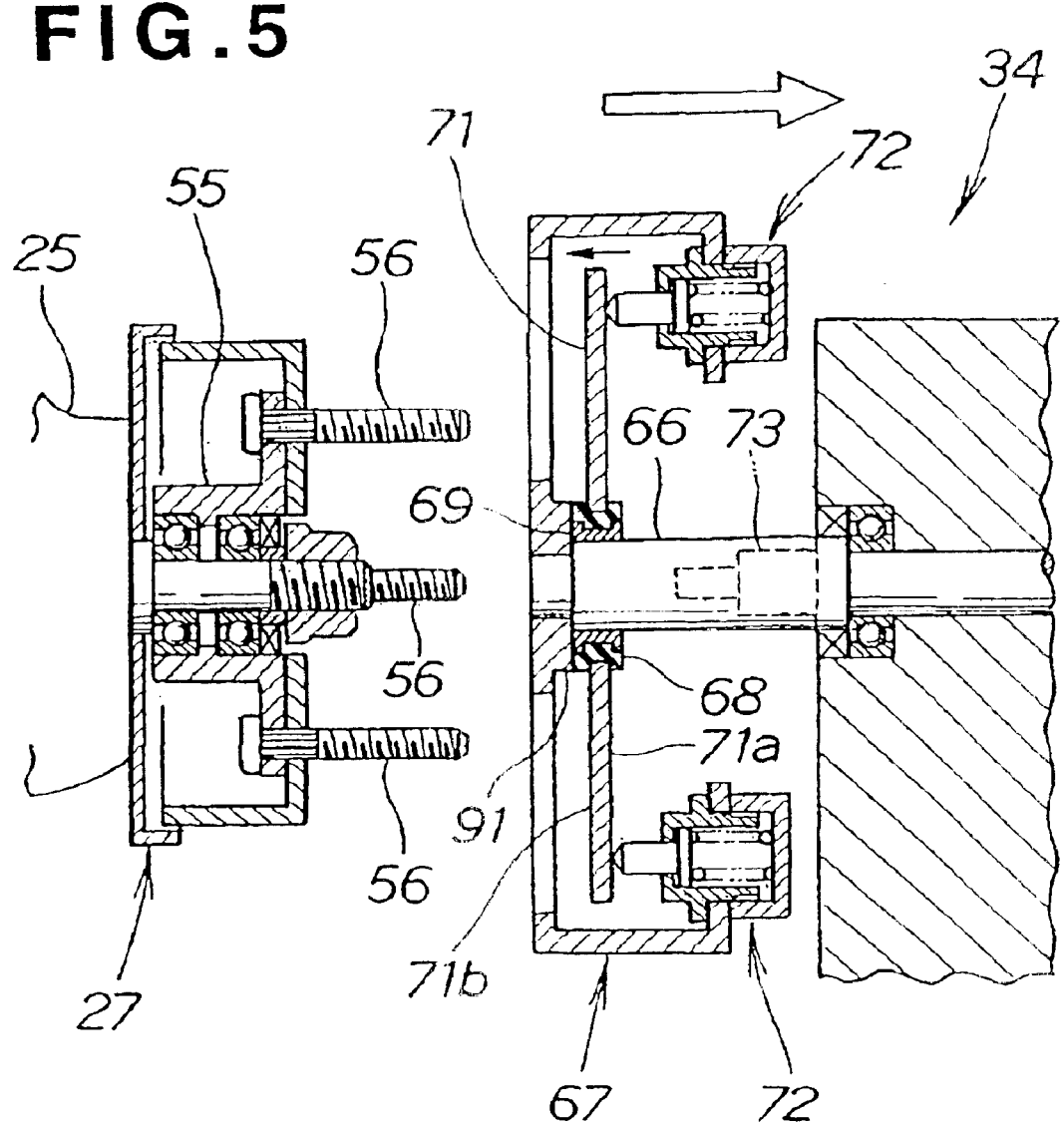
FIG. 5 is a sectional view corresponding to FIG. 4 with a wheel alignment measuring part and a wheel hub part shown separated.

FIG. 5 shows the alignment measuring part of the wheel alignment measuring apparatus shown in FIG. 4 detached from the suspension. When the alignment measuring part 34 is moved away from the vehicle 10 shown in FIG. 1 by means of the alignment measuring part moving device 83 shown in FIG. 2, the disc 71, which had been in abutment with the hub bolts 56, is pushed by the pressing mechanisms 72 and moves to the left in the figure until the bush 68 and the rubber 69 abut with the boss part 91 of the wheel hub driving member 67. As a result of being fitted to the shaft 66 by way of the bush 68 and the rubber 69, the disc 71 can incline freely with respect to the shaft 66 as shown in FIG. 4 and can move freely in the axial direction of the shaft 66 by sliding along the shaft 66 as shown in FIG. 5.

And as a result of the bush 68 being provided at the center of the disc 71, referring to FIG. 2, for example when the electric motor 62 has been stopped and the wheel hub 55 rotates under inertia, the disc 71 can rotate smoothly together with the wheel hub 55 and no deviation arises in the angular position of the disc 71 with respect to the wheel hub 55 in the direction of rotation.

Also, in FIG. 5, if the side face 71a of the disc 71 on the pressing mechanism 72 side has its surface roughness made small and is plated and brought to a mirror finish and the side face 71b of the disc 71, which abuts with the hub bolts 56, has its surface roughness increased or is processed to make it non-slip, the angular positions of the wheel hub 55 and the disc 71 can be further prevented from deviating when the electric motor 62 is stopped.

A wheel alignment measuring method used with the wheel alignment measuring apparatus 30 described above will now be explained.

First, with respect to a vehicle 10 arriving on the production line, as shown in FIG. 1, the alignment measuring part 34 is moved with the alignment measuring part moving device 83 and set against the suspension assembly 13 of the vehicle 10, as shown in FIG. 2.

Then, the first cylinder device 37 of the suspension positioning mechanism 35 is operated to support the bottom of the knuckle 25 with the suspension supporting part 43, and the second cylinder device 38 is operated to pull down the sub-frame 12 and the body 11 and set the suspension assembly 13 to the same state as its state as of when the vehicle has been fitted with wheels and is parked on a ground surface (a state wherein the knuckle 25 ends of the suspension arms 21, 22, 23 and 24 have swung upward and the suspension struts 26 are compressed).

Then, with the disc 71 abutting on the hub bolts 56 as shown in FIG. 4, the electric motor 62 shown in FIG. 2 is operated. Rotation of the output shaft 63 of the electric motor 62 is transmitted through the shaft 66 and the wheel hub driving member 67 to the hub bolts 56, the wheel hub 55 and the disc 71, and the hub bolts 56 and the disc 71 rotate integrally. Consequently, referring to FIG. 4, the distance Lf detected by the front-side displacement sensor 73 and the distance Lr detected by the rear-side displacement sensor 74 continually change.

Figure 6:
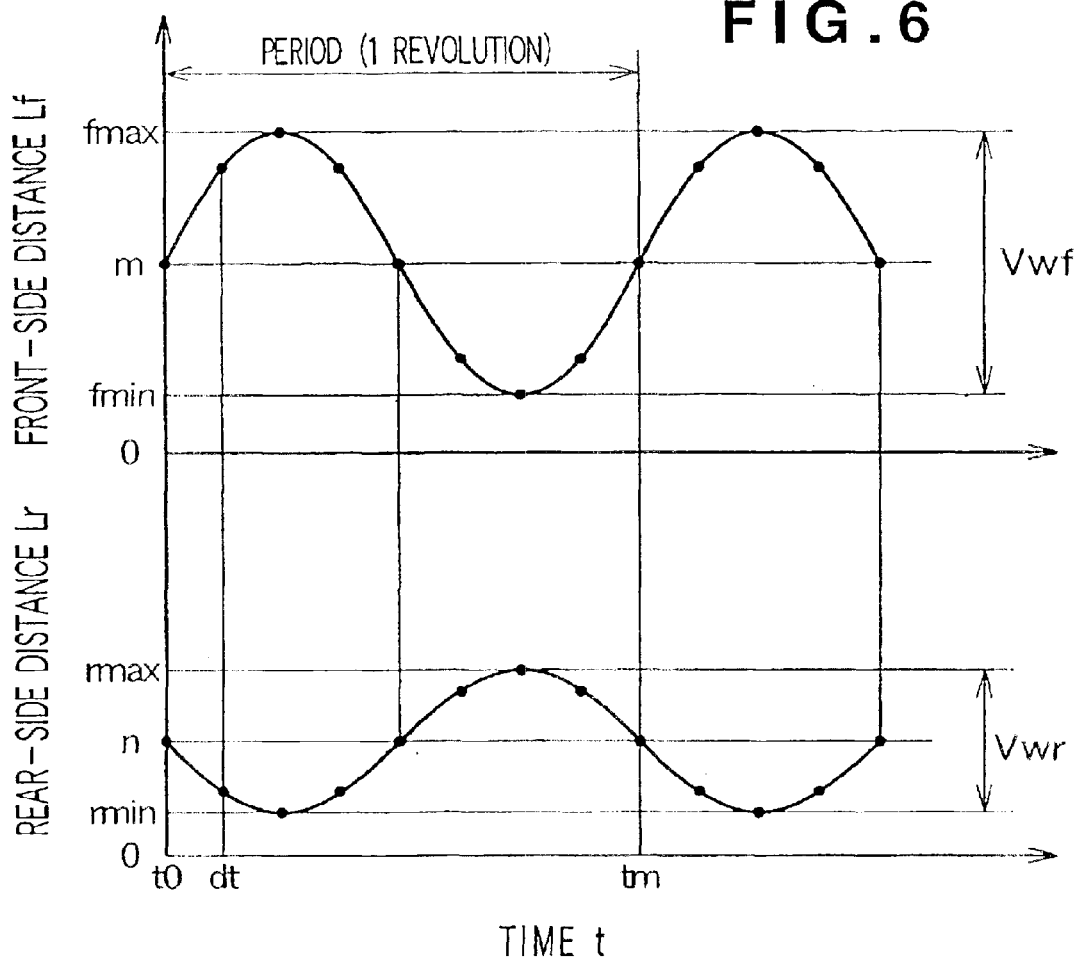
FIG. 6 is a graph for obtaining average values of amplitudes of a front-side distance and a rear-side distance.

FIG. 6 is a graph illustrating the wheel alignment measuring method used by a wheel alignment measuring apparatus according to the first embodiment, and shows change of the front-side distance Lf and the rear-side distance Lr. The vertical axis of the graph shows front-side distance Lf and rear-side distance Lr, and the horizontal axis shows time t. The curves in the graph are continuous data on the front-side distance Lf and the rear-side distance Lr, and the points on these curves are actual measurement points at time intervals dt. This time interval dt can be set short or long according to requirements.

Considering a period from a time t0 to a time tm over which the disc rotates through one revolution, when the front-side distance Lf is the same at the end point tm of the period as it was at the start point t0 (here, the distance being 'the same' at each point will be taken to mean the difference between the distance at the start point and the distance at the end point being within a predetermined value; this will be discussed in more detail later), and when the rear-side distance Lr is the same at the time t0 and the time tm, as the center value of the amplitude Vwf of the front-side distance Lf over the period for example the average m of the maximum value fmax and the minimum value fmin, or the average m of the data from the eight consecutive measurement points in the period (in this embodiment and the other embodiment which follows, for convenience the number of measurement points is taken to be eight; however, the number of measurement points can be changed according to requirements) is obtained, and similarly as the center value of the amplitude Vwr of the rear-side distance Lr over the period for example the average n of the maximum value rmax and the minimum value rmin is obtained or the average n of the eight consecutive measurement points in the period is obtained.

Figures 7A, 7B:
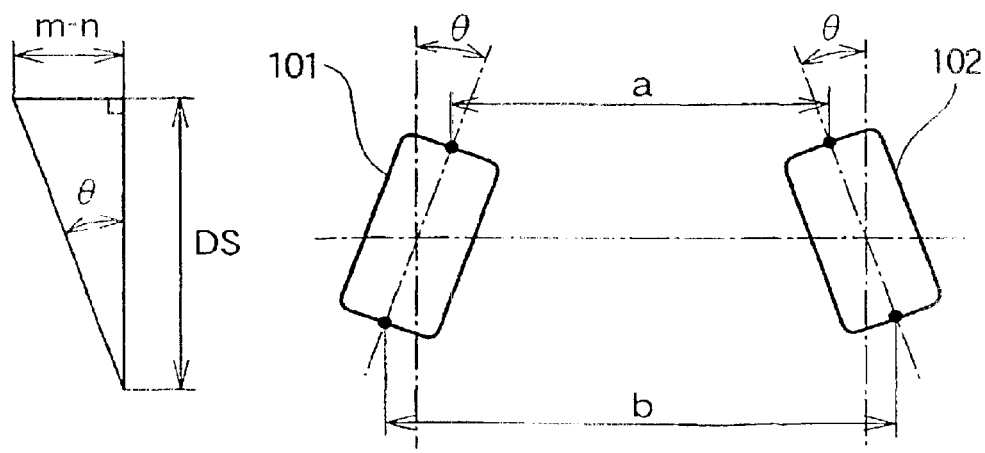

FIGS. 7A and 7B are action views for obtaining a toe angle θ.

In FIG. 7A, when the distance DS between the front-side displacement sensor 73 and the rear-side displacement sensor 74 shown in FIG. 4 and the difference (m−n) between the average m and the average n obtained in FIG. 6 are taken as the lengths of the two perpendicular sides of a right-angle triangle, the angle of inclination θ can be calculated as the angle which satisfies tan θ=(m−n)/DS. That is, this angle of inclination θ is the angle of inclination of the disc 71 shown in FIG. 4 and is the inclination angle of the wheel hub 55.

As shown in FIG. 7B, this angle of inclination θ is the toe angle of the left and right wheels 101 and 102, and if when the wheels 101, 102 are inclined inward by this toe angle θ the distance between the centers of the front parts of the wheels 101, 102 is written a and the distance between the centers of the rear parts of the wheels 101, 102 is written b, then (b−a) is the toe-in.

Figure 8:
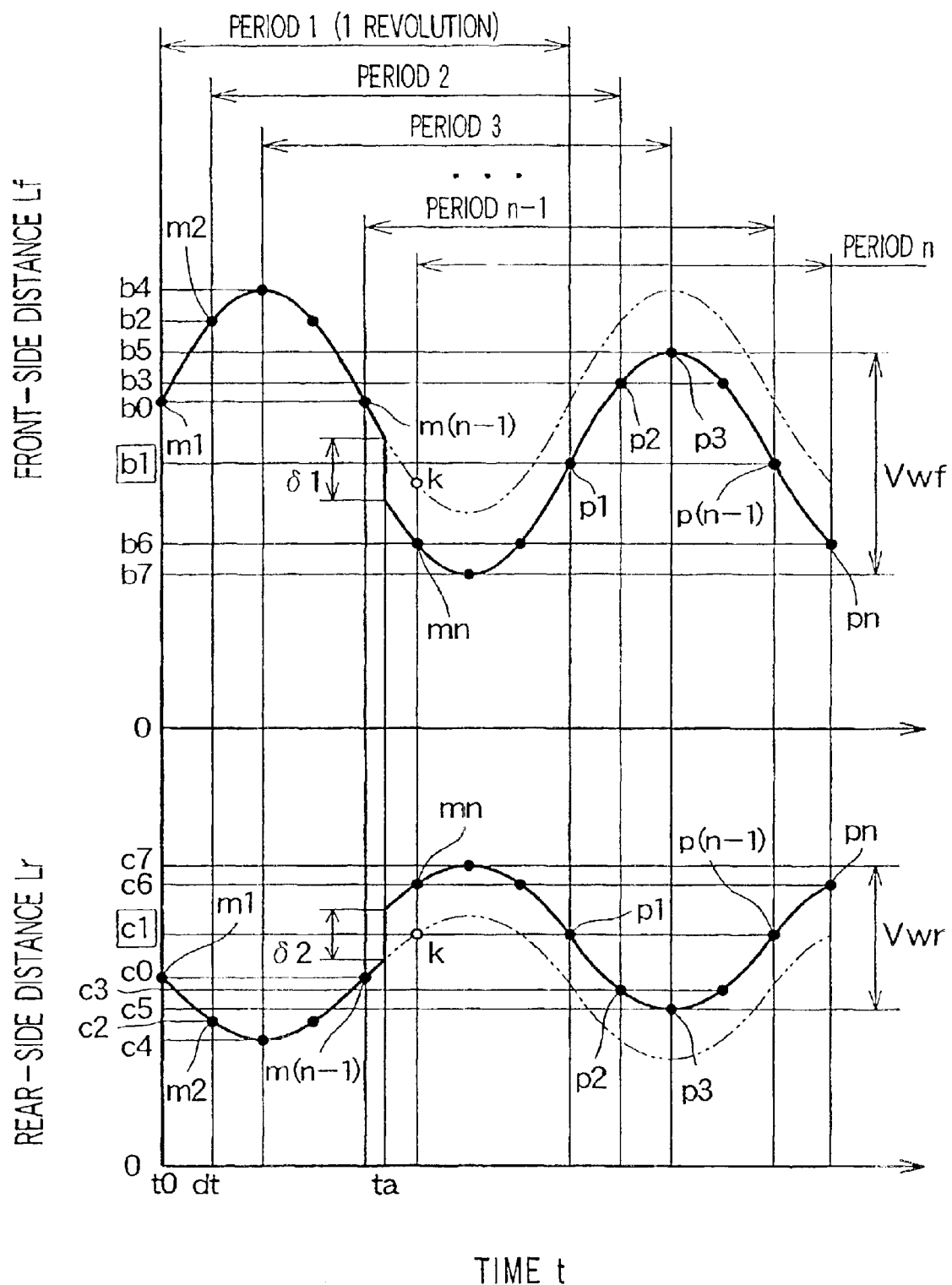
FIG. 8 is a graph corresponding to FIG. 6 showing an example of shifting of a displacement waveform of a rotating disc.

FIG. 8 corresponds to the graph shown in FIG. 6. The points on the curves shown in this graph are actual measurement points, and these measurement points are obtained by the front-side distance Lf and the rear-side distance Lr being measured at the same time.

For the front-side distance Lf, a measurement point at time t0 is called measurement point m1, and measurements are made at time intervals of dt from this measurement point m1. This time interval dt is inputted with the input device 76 shown in FIG. 2.

For example it will be supposed that at a time ta after the measurement at a measurement point m(n−1) the disc is shifted by some outside force and thereafter the front-side distance Lf has changed to the negative side by δ1. As a result of this, the measurement point following the measurement point m(n−1) is not the measurement point k on the curve shown with a dotted line but rather becomes the measurement point m on the curve shifted by δ1 to the negative side, shown with a solid line. And when the front-side distance Lf has been measured at the measurement point p1 at which the disc has rotated through one revolution since the measurement point m1, the front-side distance b0 at the measurement point m1 and the front-side distance b1 at the measurement point p1 are compared. That is, the difference between the front-side distance b0 at the starting point of the period 1 and the front-side distance b1 at the end point is calculated.

If the difference (b1−b0) between the front-side distance at the start point and that at the end point is within a set distance match determination range, it is determined that the start point front-side distance b0 and the end point front-side distance b1 match (are the same) and measurement is ended, and if the difference (b1−b0) is outside the distance match determination range then measurement is continued.

Here, a distance match determination value will be written Vst and the distance match determination range will be made (−Vst to +Vst). Here, it is deemed that the difference (b1−b0) is outside the distance match determination range (−Vst to +Vst), i.e. |b1−b0|>Vst, and measurement is continued.

Next, at the time of the measurement point p2, it is determined whether or not the difference (b3−b2) between the front-side distance b2 at the measurement point m2 and the front-side distance b3 at the measurement point p2 of a period 2 during which the wheel rotates through one revolution is within the distance match determination range (−Vst to +Vst). In this period 2, because the measurement point m2 is on the pre-disc-shift curve and the measurement point p2 is on the post-disc-shift curve, |b3−b2|>Vst and measurement is continued further. And also in period 3, |b5−b4|>Vst and measurement is continued.

As measurement is continued further and the period n immediately after the disc shifted through δ1, whose start point is the measurement point mn and whose end point is the measurement point pn, is reached, because both the measurement points mn and pn are points on the post-disc-shift curve and from the front-side distance b6 at the measurement point mn and the front-side distance b6 at the measurement point pn the relationship −Vst≦(b6−b6)≦Vst, that is, |b6−b6|≦Vst (i.e. θ≦Vst) holds, measurement is ended. And accordingly, the difference Vwf between the maximum front-side distance value b5 and the minimum front-side distance value b7 in the period n becomes the amplitude of the front-side distance Lf.

As the center value of the amplitude Vwf, either the average av1 of the maximum front-side distance value b5 and the minimum front-side distance value b7 is obtained as av1=(b5−b7)/2 or the average av2 of the eight consecutive points between the measurement point mn and the measurement point pn in the period n (that is, of the nine points in the period n, eight points excluding either the start point mn or the end point pn) is obtained as av2=(b6+b7+b6+b1+b3+b5+b3+b1)/8. Here, av1=av2=b1. The number of consecutive measurement points used for obtaining the average does not have to be eight and can be changed according to requirements.

And also for the rear-side distance Lr, the average value of the rear-side distance Lr of when for example at the time ta, after the measurement at the measurement point m(n−1), the disc shifts under some outside force and the rear-side distance Lr shifts through δ2 to the positive side is obtained in the same way. The intermediate explanation will be omitted, but the result is that the difference Vwr between the maximum rear-side distance c7 and the minimum front-side distance c5 becomes the amplitude of the rear-side distance Lr. Accordingly, as the center value of the amplitude Vwr, either the average av3 of the maximum rear-side distance c7 and the minimum rear-side distance c5 is obtained as av3= (c7−c5)/2 or the average av4 of eight consecutive points between the measurement point mn and the measurement point pn in the period n is obtained as av4=(c6+c7+c6+c1+c3+c5+c3+c1)/8. Here, av3=av4=c1.

From the average value b1 of the front-side distance Lf and the average value c1 of the rear-side distance Lr obtained above, the angle of inclination θ and toe-in (b−a) can be obtained as illustrated in FIGS. 7A and 7B.

If either the difference between the front-side distance Lf at the start point and the front-side distance Lf at the end point or the difference between the rear-side distance Lr at the start point and the rear-side distance Lr at the end point does not fall within the distance match determination range (−Vst to +Vst), measurement is ended when a set measurement time Mt (which will be further discussed later) inputted with the input device 76 shown in FIG. 2 is exceeded.

Figure 9:
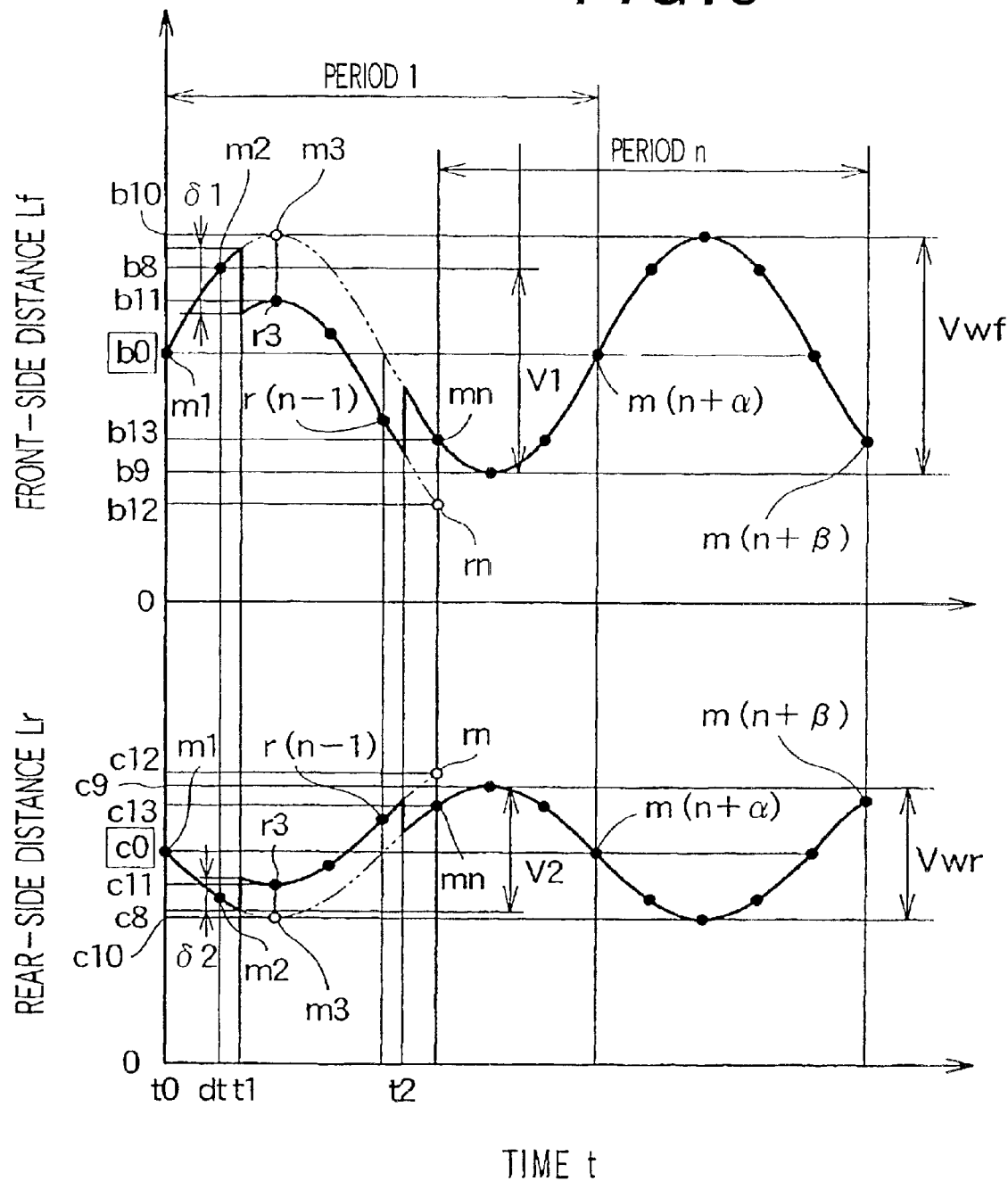
FIG. 9 is a graph corresponding to FIG. 8 showing an example wherein the displacement waveform has shifted and subsequently returned to its original level.

Referring to the graph of FIG. 9, it will now be supposed that in measurement of the front-side distance Lf, for example at a time t1 after the measurement at the measurement point m2, the disc 71 shown in FIG. 4 shifts under some outside force and thereafter the front-side distance Lf has shifted to the negative side through δ1. As a result of this, the measurement point following the measurement point m2 becomes a measurement point r3 on the curve shifted through δ1 to the negative side, shown with a solid line. Hereafter, measurement is continued on this curve shown with a solid line shifted through δ1 to the negative side; however, for example if at a time t2 after a measurement is taken at the measurement point r(n−1) the shifted disc returns to its original position, the measurement point following the measurement point r(n−1) becomes the measurement point mn on the original curve, also shown at this point with a solid line, which is δ1 to the positive side of the shifted curve.

In the period 1 from the measurement point m1 to the measurement point m(n+α) in which the disc rotates through one revolution, from front-side distance Lf=b0 at the measurement point m1 and front-side distance Lf=b0 at the measurement point m(n+α), the difference between these values of front-side distance Lf is zero and, as explained with reference to FIG. 8, falls within the distance match determination range (−Vst to +Vst). Accordingly, with just the processing explained above with reference to FIG. 8, the difference V1 between the maximum front-side distance b8 and the minimum front-side distance b9 is taken as the amplitude, and consequently it is not possible to measure the center value of the front-side distance Lf correctly.

To avoid this, when the measurements at the measurement points m1 and m2 have been made, the computing/storing device 75 shown in FIG. 2 stores the respective times t and front-side distances Lf of these measurement points m1, m2 and from this data calculates a measurement point m3 expected to become the next measurement point.

Then, it determines whether or not the difference (b11−b10) between the front-side distance b10 of this measurement point m3 and the front-side distance b11 actually measured at the measurement point r3 is within a disc shift determination range (−Cst to +Cst); that is, whether or not the disc has displaced abnormally. Here, Cst is a disc shift determination value. If the difference (b11−b10) is outside the disc shift determination range (−Cst to +Cst), it is determined that the disc has displaced abnormally, and measurement is carried out over a period having the measurement point r3 as its start point.

And similarly thereafter, from the data of the time t and front-side distance Lf of each measurement point at which a measurement has been made, the front-side distance Lf at the next measurement point is predicted, and for each measurement it is determined whether or not the difference between this front-side distance Lf and the front-side distance Lf of the measurement point actually measured are within the disc shift determination range (−Cst to +Cst).

Also, after the measurement at the measurement point r(n−1), the computing/storing device 75 calculates a measurement point rn expected to become the next measurement point from stored data on the times t and front-side distances Lf of the measurement points from the measurement point r3 to the measurement point r(n−1). And it is determined whether or not the difference (b13−b12) between the front-side distance b12 of this measurement point rn and the front-side distance b13 at the measurement point mn actually measured is within the disc shift determination range (−Cst to +Cst), i.e. whether or not the disc has shifted. If the difference (b13−b12) is outside the disc shift determination range (−Cst to +Cst), it is determined that the disc has displaced abnormally (shifted) and measurement is carried out over a period having the measurement point mn as its start point. If then no shift of the disc is detected in the period n from the measurement point mn to the measurement point m(n+β), measurement of the front-side distance Lf is ended.

The difference between the maximum front-side distance b10 and the minimum front-side distance b9 in this period n is the amplitude Vwf of the front-side distance Lf. As the center value of this amplitude Vwf, either av5=(b10−b9)/2 or the average av6 of eight consecutive points in the period n from the measurement point mn to the measurement point m(n+β) can be obtained. Here, av5=av6=b0.

And also for the rear-side distance Lr, to deal with a case wherein during measurement for example at the time t1 after the measurement at the measurement point m2 the disc shifts under some outside force and thereafter the rear-side distance Lr has shifted through β2 to the positive side and then at time t2 the shifted disc returns to its original position, in the same way as in the measurement of the front-side distance Lf, when the rear-side distance is measured at the measurement points m1 and m2, the computing/storing device 75 shown in FIG. 2 stores the times t and rear-side distances Lr of the measurement points m1 and m2 and from this data calculates a measurement point m3 expected to be the next measurement point. It then determines whether or not the difference (c11−c10) between the rear-side distance c10 of this measurement point m3 and the rear-side distance c11 of the measurement point r3 actually measured is within the disc shift determination range (−Cst to +Cst), i.e. whether or not the disc has shifted. If the difference (c11−c10) is outside the disc shift determination range (−Cst to +Cst) it is determined that the disc has displaced abnormally and measurement is carried out over a measurement period having the measurement point r3 as its starting point.

And similarly thereafter, from the data of the time t and rear-side distance Lr of each measurement point at which a measurement has been made, the rear-side distance Lr at the next measurement point is predicted, and for each measurement it is determined whether or not the difference between this rear-side distance Lr and the rear-side distance Lr of the measurement point actually measured are within the disc shift determination range (−Cst to +Cst).

Also, after the measurement at the measurement point r(n−1), the computing/storing device 75 calculates a measurement point rn expected to become the next measurement point from stored data on the times t and rear-side distances Lr of the measurement points from the measurement point r3 to the measurement point r(n−1). And it is determined whether or not the difference (c13−c12) between rear-side distance c12 of this measurement point rn and the rear-side distance c13 at the measurement point mn actually measured is within the disc shift determination range (−Cst to +Cst), i.e. whether or not the disc has shifted. If the difference (c13−c12) is outside the disc shift determination range (−Cst to +Cst), it is determined that the disc has displaced abnormally and measurement is carried out over a period having the measurement point mn as its start point. If no shift of the disc is detected in the period n from the measurement point mn to the measurement point m(n+β), measurement of the rear-side distance Lr is ended.

The difference between the maximum rear-side distance value c9 and the minimum front-side distance value c10 in this period n is the amplitude Vwr of the rear-side distance Lr. As the center value of this amplitude Vwr, either av7=(c9−c10)/2 or the average av8 of eight consecutive points in the period n from the measurement point mn to the measurement point m(n+β) can be obtained. Here, av7=av8=c0.

From the average b0 of the front-side distance Lr and the average c0 of the rear-side distance Lr obtained above, the angle of inclination θ of the disc and the toe-in (b−a) can be obtained as illustrated in FIGS. 7A and 7B.

Including the details explained above with reference to FIGS. 6 through 9, the wheel alignment measuring method will now be explained on the basis of the flow chart shown in FIG. 10 and FIG. 11.

Figure 10:
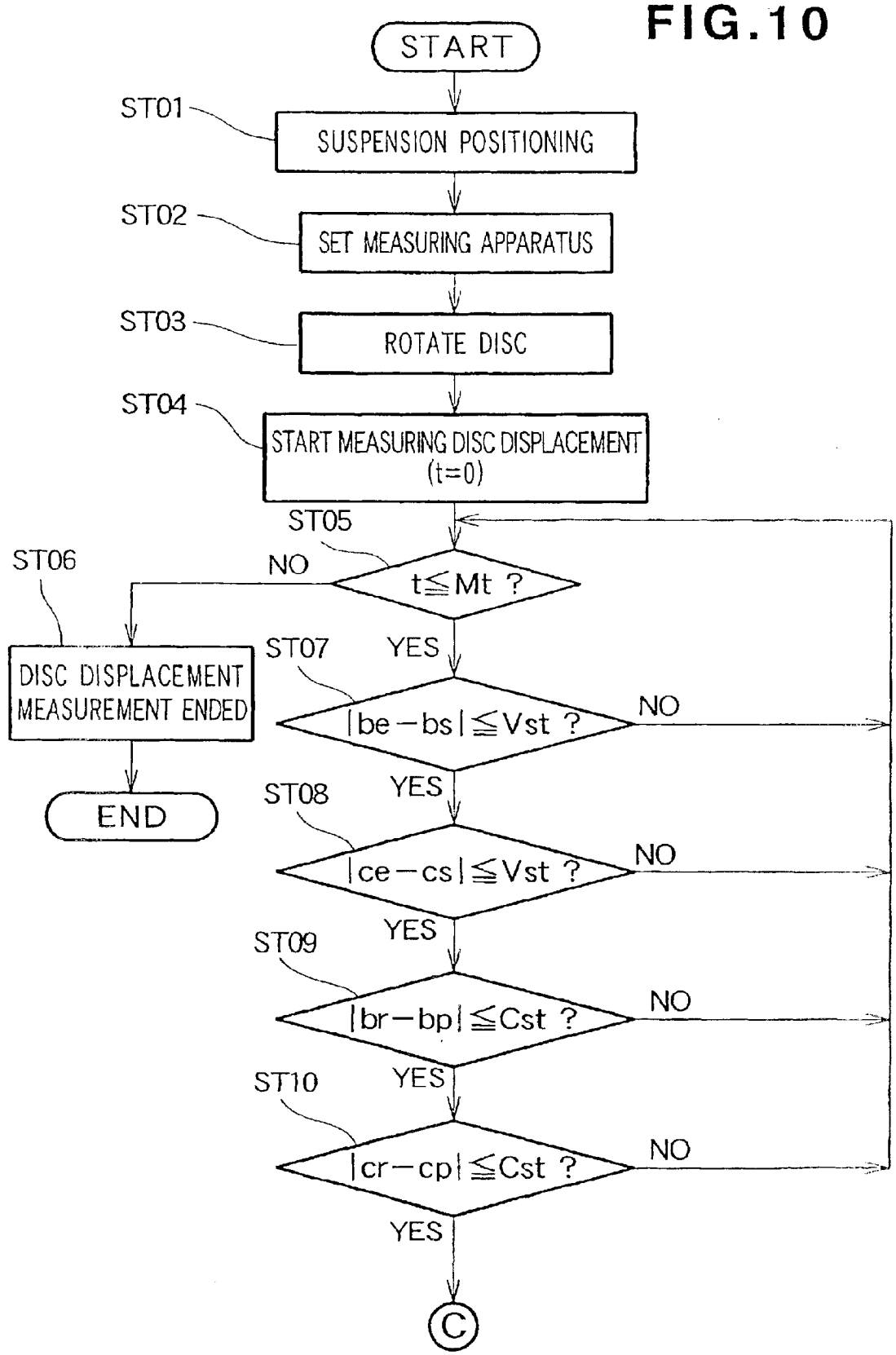
FIG. 10 is a flow chart showing the operation of the wheel alignment measuring apparatus shown in FIG. 2.
Figure 11:
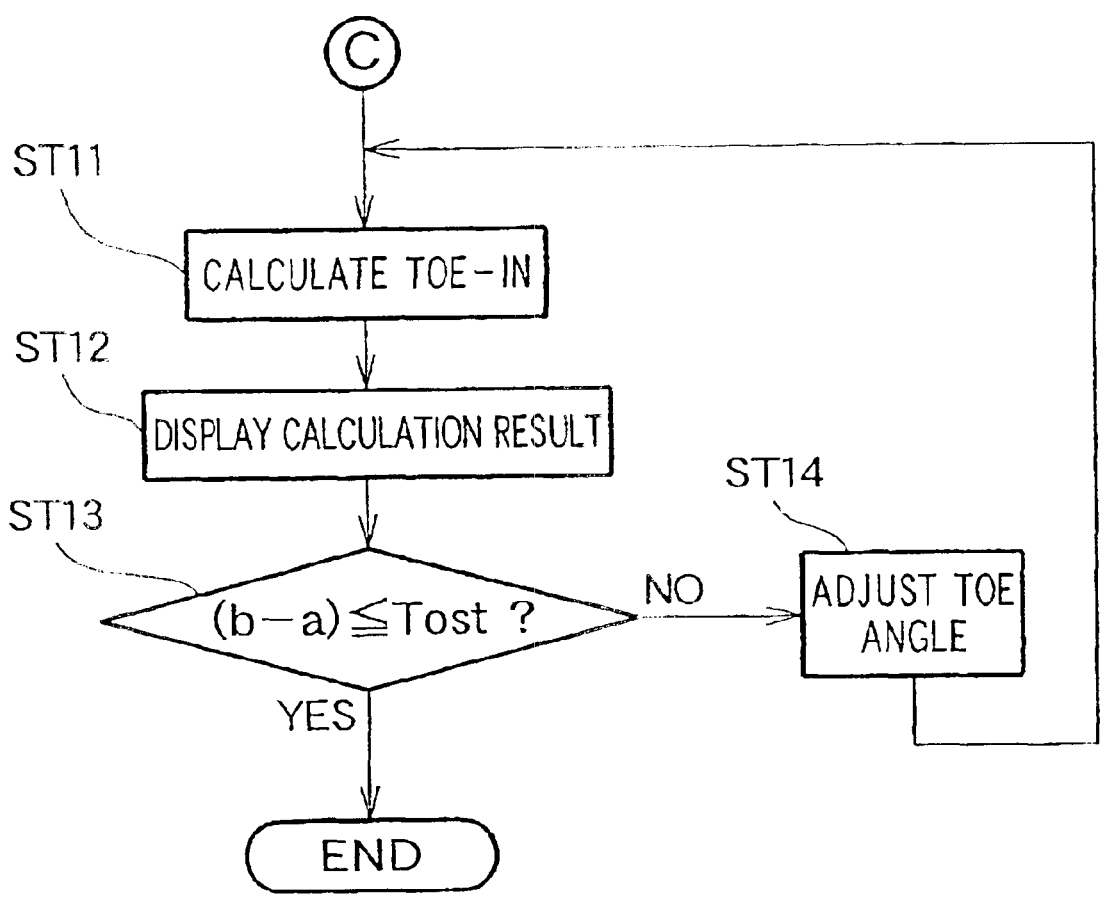
FIG. 11 is a flow chart continuing from the flow chart shown in FIG. 10.

Referring to FIG. 10, step (hereinafter, ST) 01: Using the suspension positioning mechanism, positioning of the suspension of the vehicle is carried out.

ST02: As shown in FIG. 2, the disc 71 is set against the hub bolts 56 of the suspension assembly 13 and the wheel alignment measuring apparatus is set.

ST03: The electric motor 62 is operated to rotate the disc 71.

ST04: Measurement of displacement of the disc 71 at the front side and the rear side of the disc (the front-side distance and the rear-side distance) is started. At this time, a timer is turned ON (time t=0).

ST05: It is determined whether or not the elapsed time t from timer ON is equal to or below a set measurement time Mt, i.e. whether or not t≦Mt. When t≦Mt does not hold (NO), processing proceeds to ST06, and when t≦Mt holds (YES) processing proceeds to ST07.

ST06: Disc displacement measurement is ended.

ST07: In a measurement period during which the disc rotates through one revolution, to determine whether or not there is recurrence of the front-side distance at the start point and the end point, it is determined whether or not the difference (be−bs) between the front-side distance bs at the start point of the measurement period and the front-side distance 'be' at the end point of the measurement period is within the distance match determination range (−Vst to +Vst), i.e. if |be−bs|≦Vst. When |be−bs|≦Vst does not hold (NO), processing returns to ST05, and when |be−bs|≦Vst does hold (YES), processing proceeds to ST08.

ST08: In a measurement period during which the disc rotates through one revolution, to determine whether or not there is recurrence of the rear-side distance at the start point and the end point, it is determined whether or not the difference (ce−cs) between the rear-side distance cs at the start point of the measurement period and the rear-side distance ce at the end point of the measurement period is within the distance match determination range (−Vst to +Vst), i.e. if |ce−cs|≦Vst. When |ce−cs|≦Vst does not hold (NO), processing returns to ST05, and when |ce−cs|≦Vst does hold (YES), processing proceeds to ST09.

ST09: To determine whether or not the disc has shifted during measurement, it is determined whether or not the difference (br−bp) between the front-side distance br at the actual measurement point and the front-side distance bp at the expected measurement point is within the disc shift determination range (−Cst to +Cst), i.e. if |br−bp|≦Cst (the disc shift determination value). If |br−bp|≦Cst does not hold (NO), processing returns to ST05, and if |br−bp|≦Cst does hold (YES) then processing proceeds to ST10.

ST10: To determine whether or not the disc has shifted during measurement, it is determined whether or not the difference (cr−cp) between the rear-side distance cr at the actual measurement point and the rear-side distance cp at the expected measurement point is within the disc shift determination range (−Cst to +Cst), i.e. if |cr−cp|≦Cst (the disc shift determination value). If |cr−cp|≦Cst does not hold (NO), processing returns to ST05, and if |cr−cp|≦Cst does hold (YES) then processing proceeds to ST11 as shown in FIG. 11.

ST11: On the basis of the center value of the front-side distance and the center value of the rear-side distance, the computing/storing device calculates the toe-in.

ST12: The calculated toe-in result is displayed on the display.

ST13: It is determined whether or not the toe-in (b−a) is below a toe-in determination value Tost, i.e. whether or not (b−a)≦Tost. If (b−a)≦Tost does not hold (NO) processing proceeds to ST14, and if (b−a)≦Tost does hold (YES), the check of toe-in, that is, wheel alignment, is ended.

ST14: The length of a tie rod of the vehicle is adjusted to adjust the toe angle. After that, processing returns to ST11.

Figure 12A:
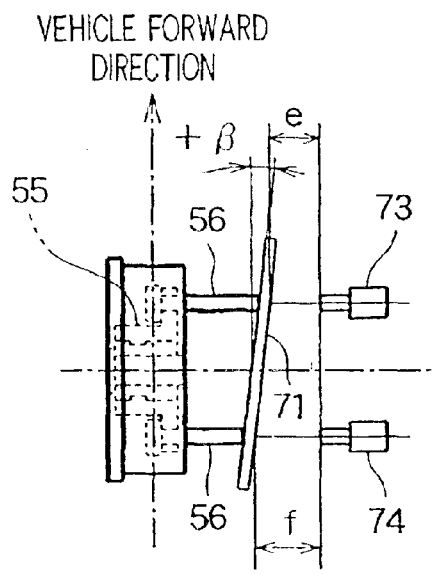
FIGS. 12A through 12C are views illustrating a relationship between disc angular position and front-side and rear-side distances.
Figure 12B:
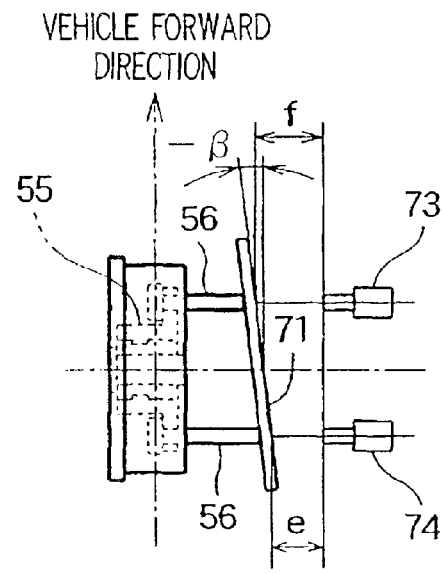

FIGS. 12A and 12B show the apparatus schematically, to illustrate the wheel alignment measurement method pertaining to the first embodiment.

Referring to FIG. 12A, the hub bolts 56 are normally manufactured by forming of rolling, and dispersion of their lengths is relatively large. Consequently, when the disc 71 is placed against the hub bolts 56, when the wheel hub 55 is pointed in the straight-forward direction of the vehicle, the disc 71 comes to be set inclined with respect to this straight-forward direction. This inclination will be written +β, the front-side distance at this time will be written e, and the rear-side distance will be written f.

FIG. 12B shows the wheel hub 55 and the disc 71 rotated through half a revolution (180°) from the state shown in FIG. 12A. At this time, the inclination of the disc 71 is −β with respect to the forward direction of the vehicle, and the front-side distance is f and the rear-side distance is e.

Figure 12C:
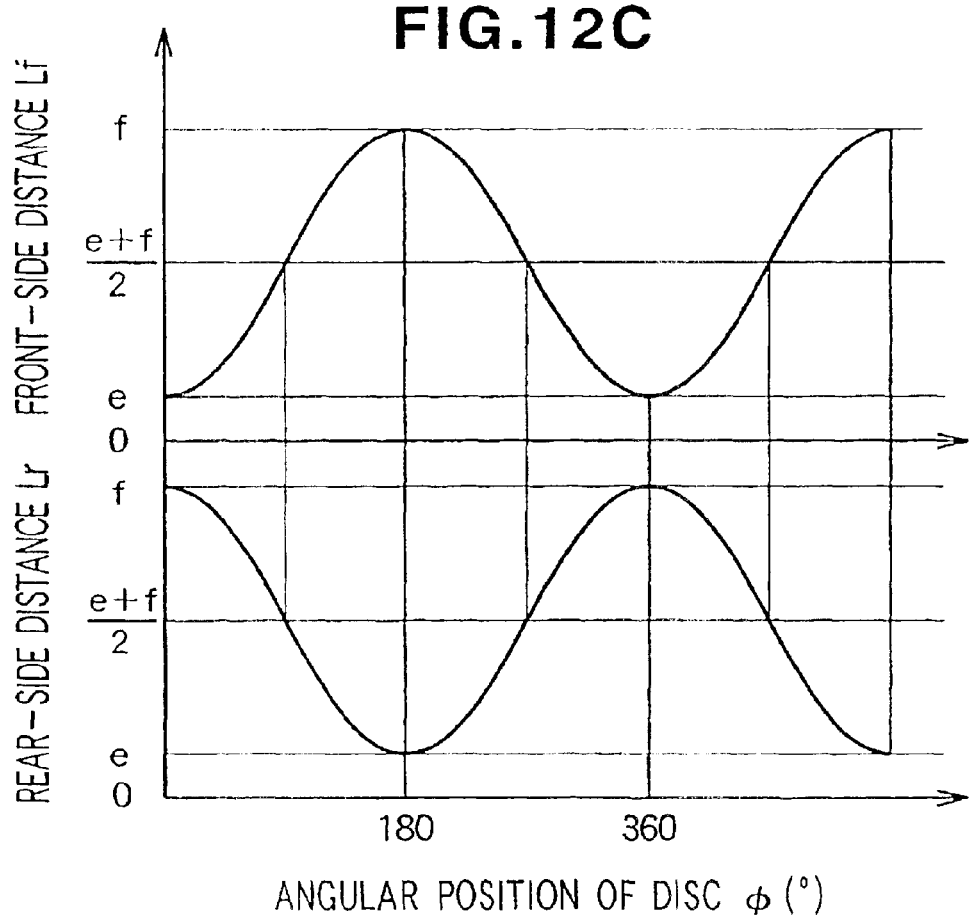

FIG. 12C is a graph showing change of the front-side distance Lf and the rear-side distance Lr when the wheel hub 55 and the disc 71 are rotated together continuously from the state shown in FIG. 12A. The vertical axis shows the front-side distance Lf and the rear-side distance Lr and the horizontal axis shows the angular position φ of the disc.

The average avf of the maximum value f and minimum value e of the front-side distance Lf is (e+f)/2, and the average avr of the maximum value f and minimum value e of the rear-side distance Lr is also (e+f)/2. Accordingly, if the inclination angle of the disc 71 is obtained from the average avf and the average avr, because in FIG. 7A the inclination angle fulfills tan θ=(avf−avr)/DS, θ is zero and the disc 71 is parallel with the vehicle forward direction. In other words, in FIGS. 12A and 12B, even if there is dispersion in the lengths of the hub bolts 56, as a result of the disc 71 being rotated, inclination of the disc 71 caused by this dispersion is canceled out, and the true inclination angle of the disc 71 (and hence the wheel hub 55) can be measured as if there was no inclination of the disc 71 with respect to the wheel hub 55.

This first embodiment of the invention has the characteristic feature that displacements of the tips of the hub bolts 56 are measured indirectly, by a disc 71 being placed against the tips of the hub bolts 56 as shown in FIG. 2 and this disc 71 being rotated integrally with the wheel hub 55 and displacements of the side face of the disc 71 being measured. Accordingly, because it is only necessary to press the disc 71 against the hub bolts 56, the measurement can be carried out simply and a reduction in measurement labor can be achieved.

As shown in FIG. 1, FIG. 2 and FIGS. 7A and 7B, a wheel alignment measuring apparatus 30 according to this embodiment measures wheel alignment before a wheel 101 or 102 is fitted to the wheel hub 55 of the body 11, and this wheel alignment measuring apparatus 30 is made up of a disc 71 to be pressed against the tips of the wheel-mounting hub bolts 56 provided on the wheel hub 55, a disc rotating mechanism 89 for rotating this disc 71 integrally with the wheel hub 55, displacement sensors 73, 74 for measuring displacements of the side face of the disc 71 as the disc 71 is rotated, and a computing/storing device 75 for calculating the angle of inclination θ of the wheel hub 55 on the basis of displacement signals from these displacement sensors 73, 74.

Because a measuring apparatus according to this embodiment is constructed to measure displacements of a side face of a disc 71 with displacement measuring devices 73, 74 without a wheel being fitted to the wheel hub 55 like this, the construction of the apparatus can be made simple and the displacement measuring devices 73, 74 can be disposed freely anywhere alongside the disc 71.

Figure 13:
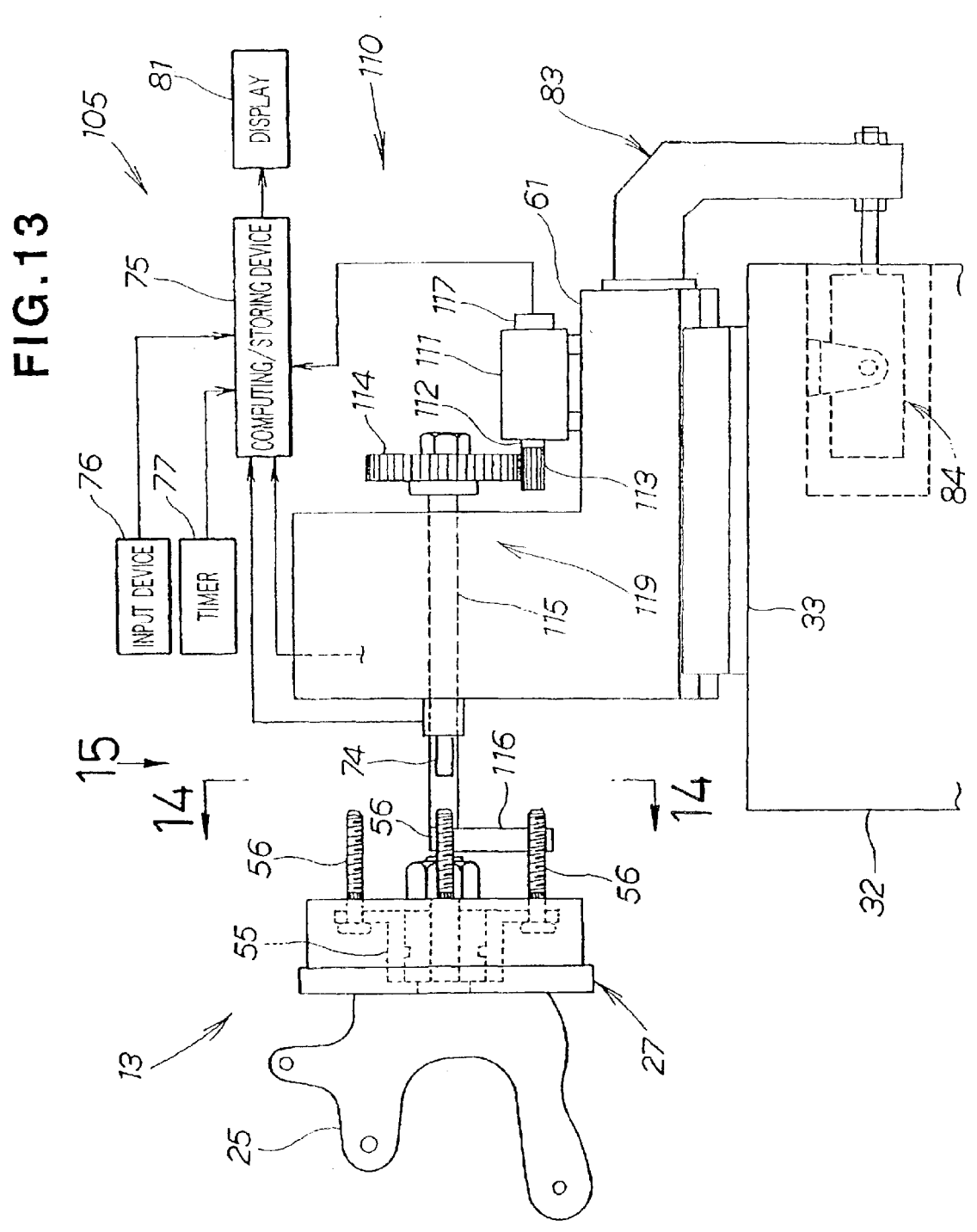

FIG. 13 shows a wheel alignment measuring apparatus according to a second embodiment of the invention. This wheel alignment measuring apparatus 105 has an alignment measuring part 110, and this alignment measuring part 110 is shown set against the suspension assembly 13 and ready to measure the wheel alignment. Parts in FIG. 13 the same as parts in the first embodiment shown in FIG. 2 have been given the same reference numerals as in FIG. 2 and will not be described again here.

The alignment measuring part 110 has an electric motor 111 mounted on a base part 61, a gear 114 meshing with tooth part 113 formed on the output shaft 112 of the electric motor 111, a shaft 115 attached to this gear 114 and rotatably supported on the base part 61, an arm 116 attached to the end of this shaft 115, and a front-side displacement sensor 73 (see FIG. 15A) and a rear-side displacement sensor 74. The reference number 117 denotes a speed sensor for detecting the speed of the output shaft 112 of the electric motor 111 an supplying a speed signal to a computing/storing device 75. The computing/storing device 75 obtains the speed of the shaft 115 on the basis of this speed signal from the speed sensor 117 and a gear ratio determined by the respective numbers of teeth of the tooth part 113 and the gear 114. The greatest merit of this embodiment is the point that it can guarantee an exact angular position of the wheel hub 55 like this.

A wheel hub rotating device 119 is made up of the electric motor 111, the output shaft 112, the gear 114, the shaft 115, the arm 116, and bearings (not shown) fitted in the base part 61 for supporting the shaft 115.

Figure 14:
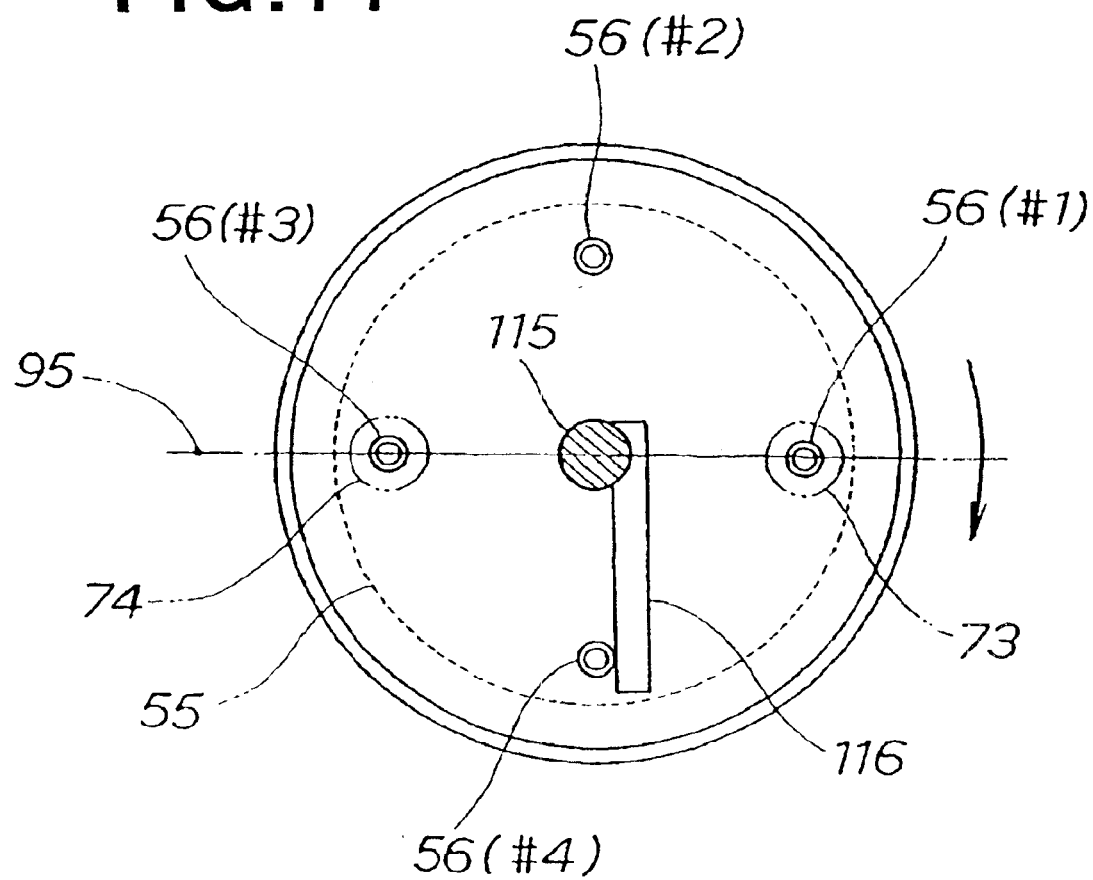
FIG. 14 is a sectional view on the line 14—14 in FIG. 13.

FIG. 14 shows the arm 116 of the alignment measuring part 110 shown in FIG. 13 engaging with one of the hub bolts 56 and rotating the wheel hub 55 in the direction of the arrow.

Figure 15A:
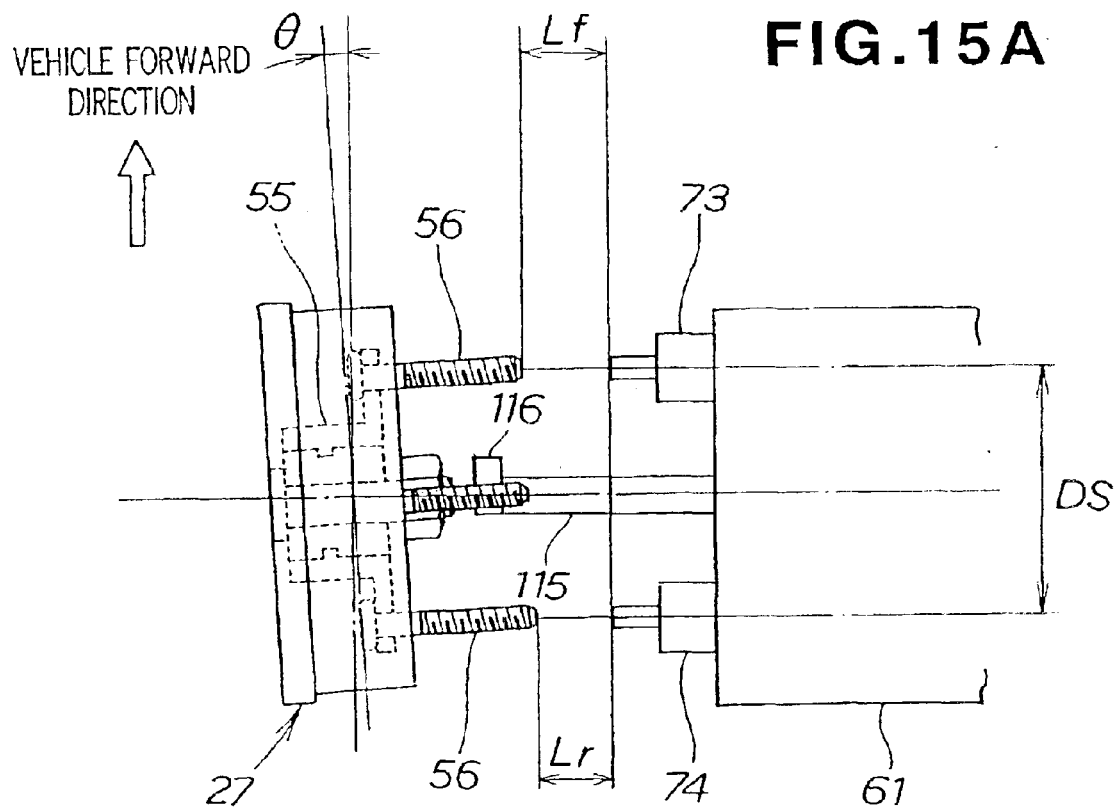
FIG. 15A is a view in the direction of the arrow 15 in FIG. 13.
Figure 15B:
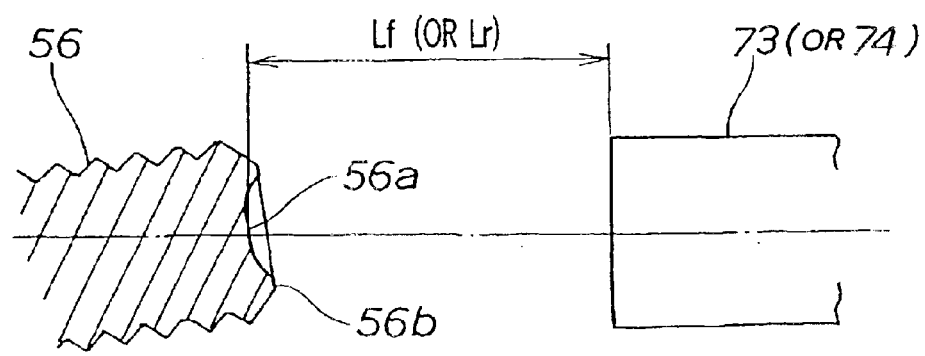
FIG. 15B is a view illustrating a positional relationship between a hub bolt and a displacement sensor.

FIGS. 15A and 15B show the positional relationship between the hub bolts 56 and the displacement sensors 73, 74 in a wheel alignment measuring apparatus according to this second embodiment.

FIG. 15A shows a state in which it has been made possible for displacements of the tips of the hub bolts 56 occurring as the wheel hub 55 rotates to be measured with the front-side displacement sensor 73 and the rear-side displacement sensor 74.

When the wheel hub 55 is inclined with respect to the length (forward) direction of the vehicle, the distance from the front-side displacement sensor 73 to the tip of one of the hub bolts 56 will be written Lf and the distance from the rear-side displacement sensor 74 to the tip of another of the hub bolts 56 will be written Lr, and the distance between the front-side displacement sensor 73 and the rear-side displacement sensor 74 will be written DS. The angle of inclination θ of the wheel hub 55 with respect to the front-rear direction of the vehicle (which when a wheel is fitted becomes the toe angle) can be obtained by measuring the above-mentioned distances Lf and Lr while rotating the wheel hub 55, as will be further discussed later.

Referring to FIG. 15B, the distance from the front-side displacement sensor 73 to an indentation 56a formed in the tip of the hub bolt 56 will be written Lf and the distance from the rear-side displacement sensor 74 to the indentation 56a will be written Lr. Alternatively, the distances from the peripheral parts 56b of the tips of the hub bolts 56 to the displacement sensors 73, 74 can be taken respectively as Lf, Lr.

A wheel alignment measuring method used with the wheel alignment measuring apparatus 105 of this second embodiment described above will now be described.

First, in FIG. 13, the alignment measuring part 110 is moved by the alignment measuring part moving device 83 to engage the arm 116 with one of the hub bolts 56 of the suspension assembly 13. Then, the electric motor 111 is driven and rotation of the output shaft 112 is transmitted by way of the tooth part 113 and the gear 114 to the shaft 115 and from the shaft 115 through the arm 116 and rotates the hub bolts 56 and the wheel hub 55, and the front-side displacement sensor 73 and the rear-side displacement sensor 74 measure the displacements of the rotating hub bolts 56, that is, the distances from the displacement sensors 73, 74 to the hub bolts 56.

Figure 16:
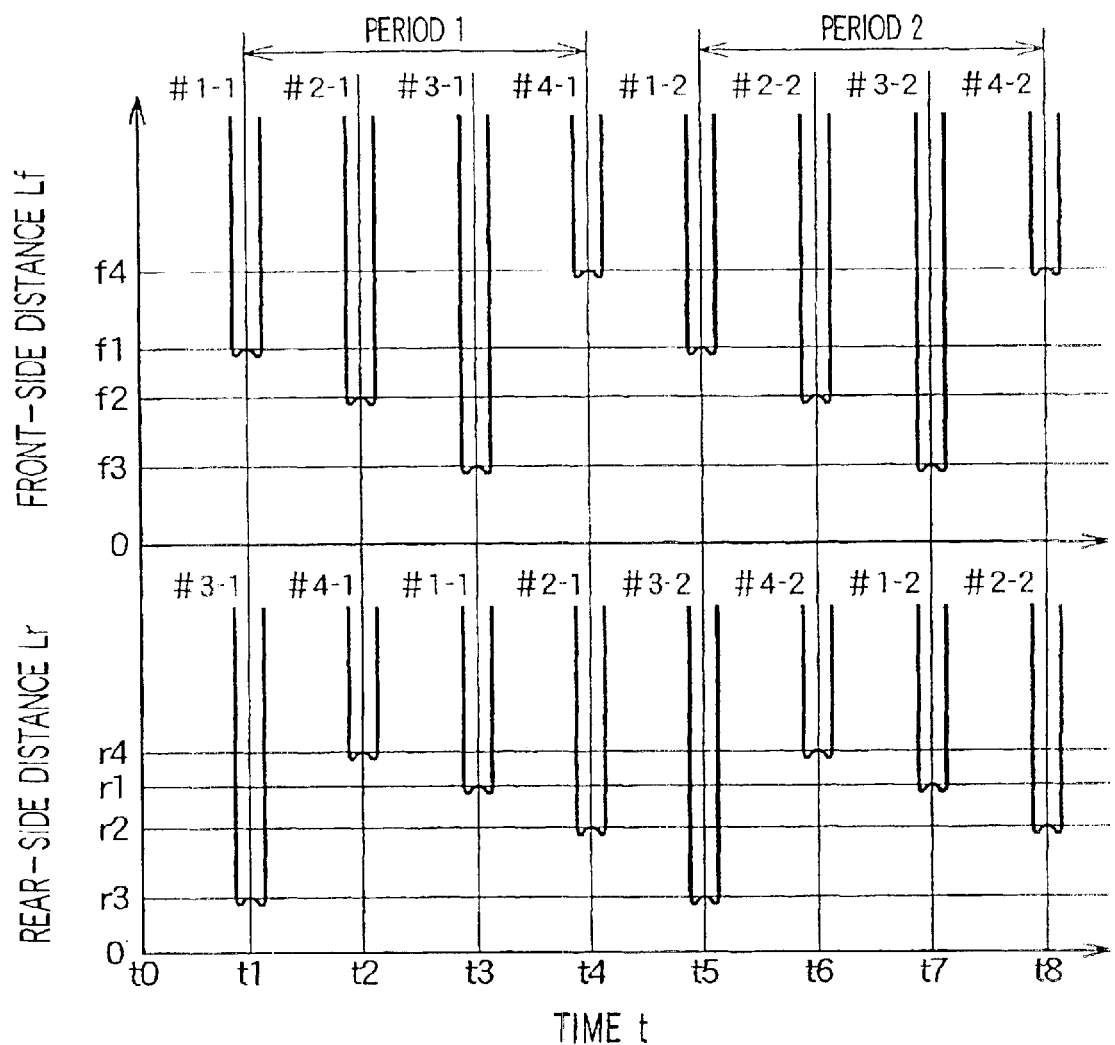
FIG. 16 is a graph showing distances between hub bolts and displacement sensors shown in FIG. 15A.

FIG. 16 is a graph illustrating this wheel alignment measuring method pertaining to the second embodiment.

The vertical axis shows the front-side distance Lf and the rear-side distance Lr, and the horizontal axis shows time t. Times t1 through t8 are times at which respective hub bolt distances are measured.

In FIG. 14, reference numerals #1, #2, #3 and #4 have been assigned for convenience to the four hub bolts 56, and the wheel hub 55 is rotated from the state shown in the figure.

In FIG. 16, each time a hub bolt #1, #2, #3, #4 approaches the front-side displacement sensor the front-side distance Lf is shown as a curve corresponding to the tip shape of the hub bolt #1, #2, #3, #4, and the reference numerals (#1-1), (#2-1), (#3-1), (#4-1) are assigned to the respective curves of the hub bolts #1, #2, #3 and #4 in a first rotation (period 1) and the reference numerals (#1-2), (#2-2), (#3-2), (#4-2) are assigned to the respective curves in a second rotation (period 2).

Also, each time a hub bolt #3, #4, #1, #2 approaches the rear-side displacement sensor the rear-side distance Lr is shown as a curve corresponding to the tip shape of the hub bolt #3, #4, #1, #2, and the reference numerals (#3-1), (#4-1), (#1-1), (#2-1) are assigned to the respective curves of the hub bolts #3, #4, #1 and #2 in a first rotation (period 1) and the reference numerals (#3-2), (#4-2), (#1-2), (#2-2) are assigned to the respective curves in a second rotation (period 2).

It will be supposed that the front-side distances Lf given by the first-rotation curves (#1-1), (#2-1), (#3-1), (#4-1) are f1, f2, f3 and f4. If then the front-side distances Lf given by the second-rotation curves (#1-2), (#2-2), (#3-2), (#4-2) are the same as the front-side distances f1, f2, f3 and f4, measurement is ended when the second rotation is completed.

Figure 17:
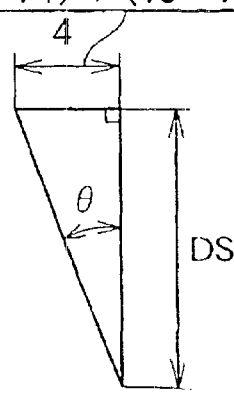
FIG. 17 is a schematic view for obtaining an inclination angle from average distances obtained from FIG. 16.

In FIG. 17, the distance DS between the front-side displacement sensor 73 and the rear-side displacement sensor 74 is made the length of one of the two perpendicular sides of a right-angle triangle. The length of the other of the perpendicular sides is obtained by calculating the average of the differences between the front-side distance Lf and the rear-side distance Lr of the opposing two of the four hub bolts #1, #2, #3 and #4 obtained from the front-side distance Lf and rear-side distance Lr results measured in FIG. 16, i.e. $((f1-r3)+(f2-r4)+(f3-r1)+(f4-r2))/4$.

On the basis of this it is possible to calculate the angle of inclination $\theta$ of the hypotenuse of the right-angle triangle, that is, the angle of inclination $\theta$ of the wheel hub, as the angle $\theta$ satisfying the relationship $\tan \theta=((f1-r3)+(f2-r4)+(f3-r1)+(f4-r2))/4/DS$. And with the angle of inclination $\theta$ obtained here it is possible to obtain the toe-in (b−a) from FIG. 7B.

Figure 18:
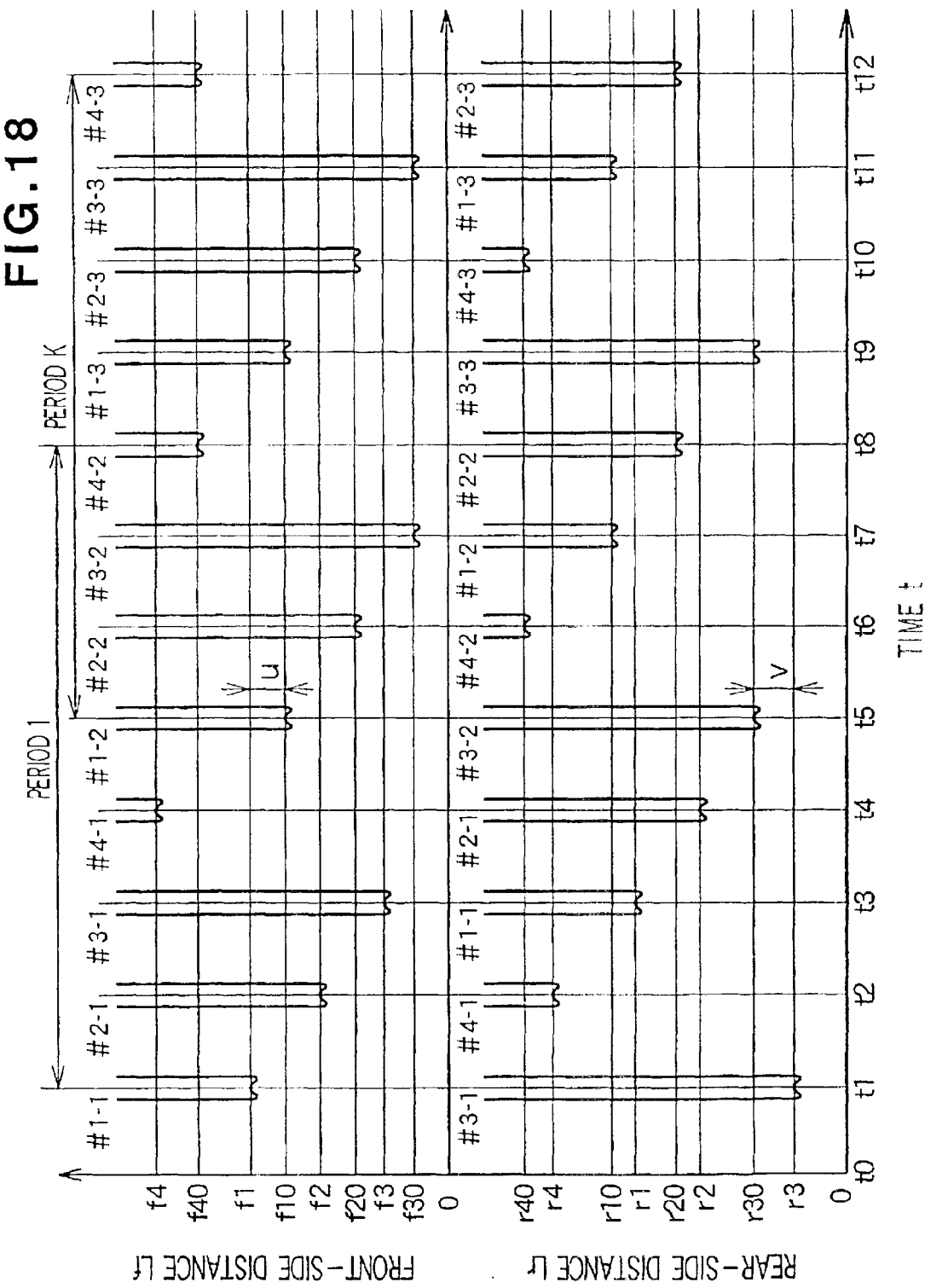
FIG. 18 is a graph showing shifting of the distances in FIG. 16.
Figure 20A:
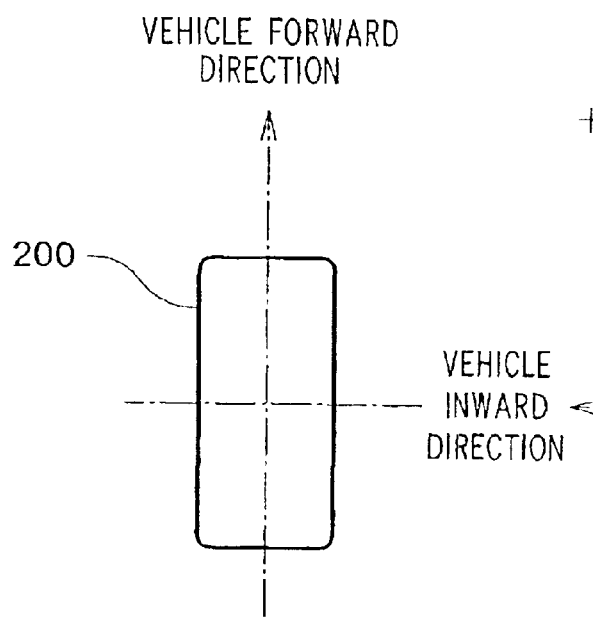
FIG. 20 is a view illustrating ordinary toe-in in related art.
Figure 20B:
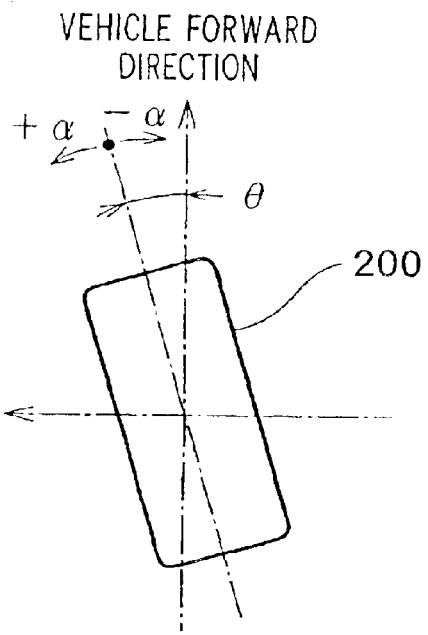
Figure 20C:
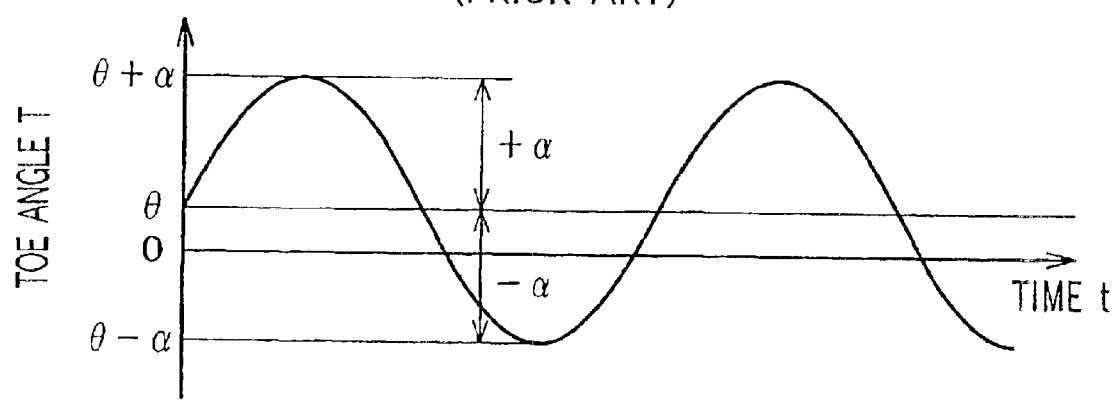

FIG. 18 is a graph corresponding to the graph of FIG. 16.

As in the graph of FIG. 16, for the front-side distance Lf, first-rotation curves corresponding to the tip shapes of the hub bolts #1, #2, #3 and #4 are called curves (#1-1), (#2-1), (#3-1) and (#4-1). Second-rotation curves are called (#1-2), (#2-2), (#3-2) and (#4-2), and also third-rotation curves are called (#1-3), (#2-3), (#3-3) and (#4-3).

And similarly for the rear-side distance Lr, first-rotation curves corresponding to the tip shapes of the hub bolts #3, #4, #1 and #2 are called (#3-1), (#4-1), (#1-1) and (#2-1); second rotation curves are called (#3-2), (#4-2), (#1-2) and (#2-2); and third-rotation curves are called (#3-3), (#4-3), (#1-3) and (#2-3). The times t1 through t12 are the times at which the hub bolt distances were measured.

The front-side distances Lf given by the first-rotation curves (#1-1), (#2-1), (#3-1) and (#4-1) will be written f1, f2, f3 and f4 respectively. And it will be supposed that the front-side distance Lf given by the second-rotation curve (#1-2) is f10. Then, when the difference u=f1−f10 in the front-side distance Lf of the hub bolt #1 between the first rotation and the second rotation with respect to a predetermined value Lst is $|u|>Lst$ ($\ne 0$), it is determined that the front-side distance f1 and the front-side distance f10 are not the same and measurement of the front-side distance Lf is continued with the front-side distance f10 given by the curve (#1-2) of the hub bolt #1 as the first measurement result.

And, for the front-side distance Lf, after time t=t9, when the absolute value |f10−f10| of the difference between the distance f10 given by the curve (#1-2) and the distance f10 given by the curve (#1-3), the absolute value f20−f201 of the difference between the distance f20 given by the curve (#2-2) and the distance f20 given by the curve (#2-3), the absolute value |f30−f30| of the difference between the distance f30 given by the curve (#3-2) and the distance f30 given by the curve (#3-3), and the absolute value |f40−f40| of the difference between the distance f40 given by the curve (#4-2) and the distance f40 given by the curve (#4-3) each become zero and become all smaller than the predetermined value Lst, it is determined that the front-side distance Lf of the second rotation and the front-side distance Lf of the third rotation are the same for each of the hub bolts #1, #2, #3 and #4.

And similarly for the rear-side distance Lr, the rear-side distances Lr given by the first-rotation curves (#3-1), (#4-1), (#1-1) and (#2-1) will be called respectively r3, r4, r1 and r2. Then, supposing that the rear-side distance Lr given by the second-rotation curve (#3-2) is r30, when the difference v=r3−r30 in the rear-side distance Lr of the hub bolt #3 between the first rotation and the second rotation with respect to the predetermined value Lst is $|v|>Lst$ ($\ne 0$), it is determined that the rear-side distance r3 and the rear-side distance r30 are not the same and measurement of the rear-side distance Lr is continued with the rear-side distance r30 given by the curve (#3-2) of the hub bolt #3 as the first measurement result.

Then, when the absolute value |r30−r30| of the difference between the distance r30 given by the curve (#3-2) and the distance r30 given by the curve (#3-3), the absolute value |r40−r40| of the difference between the distance r40 given by the curve (#4-2) and the distance r40 given by the curve (#4-3), the absolute value |r10−r10| of the difference between the distance r10 given by the curve (#1-2) and the distance r10 given by the curve (#1-3), and the absolute value |r20−r20| of the difference between the distance r20 given by the curve (#2-2) and the distance r20 given by the curve (#2-3) each become zero and become all smaller than the predetermined value Lst, it is determined that the rear-side distance Lr of the second rotation and the rear-side distance Lr of the third rotation are the same for each of the hub bolts #3, #4, #1 and #2.

From these results, in the same way as that illustrated in FIG. 17, the angle of inclination $\theta$ of the hypotenuse of the right-angle triangle, that is, the angle of inclination $\theta$ of the wheel hub, can be obtained as the angle $\theta$ satisfying $\tan \theta=((f10-r30)+(f20-r40)+(f30-r10)+(f40-r20))/4/DS$, and from this $\theta$=it is possible to obtain the toe-in (b−a) as shown in FIG. 7B.

FIG. 19A is a graph showing with respect to the angular position $\phi$ of the wheel hub changes in the front-side distance Lf, the rear-side distance Lr and the difference D between the front-side distance Lf and the rear-side distance Lr.

In the first embodiment described above with reference to FIGS. 2 through 5, because displacements of the side face of the rotating disc 71 are measured with the displacement sensors 73 and 74, displacements of the disc 71 can be measured continuously throughout a rotation. However, in this second embodiment, as described above with reference to FIGS. 13 through 15B, it is the displacements of the tips of the four hub bolts #1, #2, #3 and #4 that are measured, and consequently it is not possible to measure sideways displacements of the wheel hub 55 throughout a rotation, and depending on the positional relationship between the circumferential direction positions at which the displacement of the wheel hub 55 is at its maximum and at its minimum and the hub bolts #1, #2, #3 and #4 it may happen that it is not possible to measure the maximum and minimum values of the displacement of the wheel hub 55.

For example, measurement in a case where in the schematic view of the wheel hub 55 and the hub bolts #1, #2, #3 and #4 shown in FIG. 19B the positions at which the sideways displacement of the wheel hub 55 is at its maximum and its minimum are on the straight line 96 inclined through 30° from the hub bolt #1 to the hub bolt #2 side will now be explained.

In the graph the measurement points of the front-side distance Lf of the hub bolts #1, #2, #3 and #4 have been assigned the same reference numerals as the hub bolts; the point between the hub bolts #1 and #2 at which the front-side distance Lf is at its maximum is written w1; the point between the hub bolts #3 and #4 at which the front-side distance Lf is at its minimum is written w2; and the curve 121 passing through these measurement points #1, #2, #3 and #4 and the points w1 and w2 is made a sine wave.

At the front-side displacement sensor 73, the front-side distances Lf to the hub bolts #1, #2, #3 and #4 are measured at the points where the wheel hub angular position $\phi$=h1, h3, h4, h6 and in this order, and f51, f52, f53, f54 are obtained as the respective front-side distances Lf. The maximum value of the curve 121 is f61 (the wheel hub angular position $\phi$ at this time is $\phi$=h2), and the minimum value is f62 (the wheel hub angular position $\phi$ at this time is $\phi$=h5).

Also, in the graph the measurement points of the rear-side distance Lr of the hub bolts #3, #4, #1 and #2 have been assigned the same reference numerals as the hub bolts; the point between the hub bolts #3 and #4 at which the rear-side distance Lr is at its minimum is written x1; the point between the hub bolts #1 and #2 at which the rear-side distance Lr is at its maximum is written x2; and the curve 122 passing through these measurement points #3, #4, #1 and #2 and the points x1 and x2 is made a sine wave.

At the rear-side displacement sensor 74, the rear-side distances Lr to the hub bolts #3, #4, #1 and #2 are measured at the points where the wheel hub angular position $\phi$=h1, h3, h4, h6 and in this order, and r53, r54, r51 and r52 are obtained as the respective rear-side distances Lr. The minimum value of the curve 122 is r62 (the wheel hub angular position $\phi$ at this time is $\phi$=h2), and the maximum value is r61 (the wheel hub angular position $\phi$ at this time is $\phi$=h5).

From the front-side distance Lf measurement points #1, #2, #3, #4 and the points w1, w2 and the rear-side distance Lr measurement points #3, #4, #1, #2 and the points x1, x2, the point at which the difference D (f51−r53) in distance between the front-side distance Lf measurement point #1 and the rear-side distance Lr measurement point #3 where the wheel hub angular position $\phi$ is h1 is calculated will be called the calculation point (#1-#3). The point at which the difference D (f61−r62) in distance between the front-side distance Lf point w1 and the rear-side distance Lr point x1 at $\phi$=h2 is calculated will be called the calculation point (w1−x1). The point at which the difference D (f52−r54) in distance between the front-side distance Lf measurement point #2 and the rear-side distance Lr measurement point #4 at $\phi$=h3 is calculated will be called the calculation point (#2-#4). The point at which the difference D (f53−r51) in distance between the front-side distance Lf measurement point #3 and the rear-side distance Lr measurement point #1 at $\phi$=h4 is calculated will be called the calculation point (#3-#1). The point at which the difference D (f62−r61) in distance between the front-side distance Lf point w2 and the rear-side distance Lr point x2 at $\phi$=h5 is calculated will be called the calculation point (w2−x2). And the point at which the difference D (f54−r52) in distance between the front-side distance Lf measurement point #4 and the rear-side distance Lr measurement point #2 at $\phi$=h6 is calculated will be called the calculation point (#4-#2). If the curve passing through the calculation points (#1-#3), (w1−x1), (#2-#4), (#3-#1), (w2−x2), (#4-#2) is called the curve 123, because this curve 123 is a curve expressing the difference between a sine wave and another sine wave, when a straight line 1124 passing through the center of the amplitude of the curve 123 is drawn and the value of the difference D at this straight line 124 is called A, then the calculation point (#1-#3) and the calculation point (#3-#1), the calculation point (w1−x1) and the calculation point (w2−x2), the calculation point (#2-#4) and the calculation point (#4-#2) are equal distances from the straight line 124.

Therefore, if the values of the respective differences D of the four calculation points (#1-#3), (#2-#4), (#3-#1) and (#4-#2) are averaged, this average value is A, and if the values of the respective differences D of the two calculation points (w1−x1) and (w2−x2) are averaged, this value also is A, and the average of the values of the respective differences D of the four calculation points (#1-#3), (#2-#4), (#3-#1) and (#4-#2) and the average of the values of the respective differences D of the two calculation points (w1−x1) and (w2−x2) are equal.

That is, by obtaining the difference D (equivalent to the inclination of the wheel hub) from the actually measured front-side distance Lf measurement points #1, #2, #3 and #4 and the actually measured rear-side distance Lr measurement points #3, #4, #1 and #2, it is possible to obtain the inclination of the wheel hub without measuring the points w1, x2 at which the oscillation of the wheel hub is at its maximum value and the points w2, x1 at which the oscillation of the wheel hub is at its minimum value.

As explained above with reference to FIG. 1, FIG. 2, FIGS. 7A and 7B and FIG. 13, in the present invention a wheel hub 55 having projecting from it a plurality of hub bolts 56 for mounting a wheel 101, 102 to is rotated; displacements of the tips of the hub bolts 56 are measured directly or indirectly with at least two displacement sensors 73, 74 disposed in positions away from the hub bolts 56; and by an angle of inclination $\theta$ of the wheel hub 55 being calculated on the basis of the displacements measured by these displacement sensors 73 and 74, the wheel alignment is measured before the wheel 101, 102 is fitted to the wheel hub 55.

Because the wheel alignment can be measured before the wheels 101, 102 are fitted to the wheel hubs 55 like this, for example while the vehicle 10 is moving along a production line, the alignment of the wheels 101, 102 can be measured from the sides of the vehicle 10, without stopping the flow of production of the vehicle 10, and the productivity of manufacture of the vehicle 10 can be improved. Also, because it is only necessary to measure for example displacements of the hub bolts 56, the measurement can be carried out simply, and a reduction in measurement labor can be achieved. And also, because displacements of the hub bolts 56 are measured while the wheel hub 55 is being rotated, inclination errors of the wheel hub 55 caused by dispersion in the lengths of the hub bolts 56 can be canceled out, and the wheel alignment measurement accuracy can be increased.

According to the invention, by the displacement sensors 73, 74 being disposed facing the tips of the hub bolts 56, the displacements of the tips of the hub bolts 56 can be measured directly. And when the displacements of the tips of the hub bolts 56 are measured directly, the measurement is simple and a reduction in measurement labor can be achieved.

Also, as explained above with reference to FIG. 1, FIGS. 7A and 7B and FIG. 13, a wheel alignment measuring apparatus 105 according to the invention measures the wheel alignment before a wheel 101, 102 is fitted to the wheel hub 55 on the body 11, and has: a wheel hub rotating device 119 for rotating the wheel hub 55; a plurality of displacement sensors 73, 74, disposed facing the tips of a plurality of wheel-mounting hub bolts 56 provided on the wheel hub 55, for measuring displacements of the tips of the hub bolts 56 occurring when the wheel hub 55 is rotated; and a computing/storing device 75 for calculating an angle of inclination θ of the wheel hub 55 on the basis of displacement signals from these displacement sensors 73, 74 (for the front-side displacement sensor 73 see FIGS. 15A and 15B).

Because this measuring apparatus 105 is constructed to measure wheel alignment without a wheel being fitted to the wheel hub 55, and furthermore to measure displacements of the hub bolts 56 directly, the number of parts in the wheel alignment measuring apparatus can be reduced, its construction can be made simple, and the manufacturing cost and maintenance cost of the wheel alignment measuring apparatus 105 can be kept down.

Although in the first and second embodiments described above examples were shown wherein the displacement measuring devices (displacement sensors) were disposed in a line in the front-rear direction of the vehicle, the invention is not limited to this arrangement, and alternatively for example the displacement measuring devices can be disposed in a line in the vertical direction to measure an angle of inclination of the disc with respect to the vertical, and thereby obtain a camber angle.

And although in the embodiments described above the number of hub bolts on each wheel hub was four, the invention is not limited to this and a wheel alignment measuring method and apparatus according to the invention can be applied similarly to a vehicle with for example five, six or eight hub bolts on each wheel hub.

As described above with reference to FIG. 6, FIG. 8 and FIG. 9, in the first embodiment, the reliability of the measurement data is checked when the disc has rotated through one revolution by it being determined whether or not the distance detected by a sensor at the start point of the period of one rotation and the distance detected by the sensor at the end point of the period are the same; however, the invention is not limited to this, and alternatively the respective distances measured at the start point and the end point of half a rotation of the disc can be compared, and if the distance at the start point and the distance at the end point are the same it can be deemed that the measured data is reliable and data for the remaining half of a revolution can be inferred from the data of the measured half revolution to obtain the disc inclination angle. When this is done, the actual measurement labor and measurement time can be shortened.

INDUSTRIAL APPLICABILITY

In a wheel alignment measuring method according to the invention a wheel hub having projecting from it a plurality of hub bolts for mounting a wheel to is rotated and displacements of the tips of the hub bolts are measured directly or indirectly with at least two displacement measuring devices disposed in positions away from the hub bolts and on the basis of the displacements measured with the displacement measuring devices the angle of inclination of the wheel hub is calculated and the wheel alignment is thereby measured before the wheel is fitted to the wheel hub. Consequently, it is possible for example to measure the alignment of a plurality of wheels while the vehicle is on a production line, from the side of the vehicle, without stopping the production flow of the vehicle, and this is advantageous in improving the productivity of vehicle manufacture.

What is claimed is:

1. A wheel alignment measuring method, comprising the steps of:

rotating a wheel hub having projecting from it a plurality of hub bolts for mounting a wheel to;

measuring displacements of the tips of the hub bolts directly or indirectly with at least two displacement measuring devices disposed in positions away from the hub bolts;

calculating an angle of inclination of the wheel hub on the basis of the displacements measured with the displacement measuring devices; and measuring the wheel alignment before a wheel is fitted to the wheel hub on the basis of the calculated angle of inclination of the wheel hub.

2. A wheel alignment measuring method according to claim 1, wherein the displacements of the tips of the hub bolts are measured indirectly by placing a disc against the tips of the hub bolts and rotating this disc integrally with the wheel hub and measuring displacements of a side face of the disc.

3. A wheel alignment measuring method according to claim 1, wherein displacements of the tips of the hub bolts are measured directly by the displacement measuring devices being made to face the tips of the hub bolts.

4. An apparatus for measuring a wheel alignment before a wheel is fitted to a wheel hub of a vehicle body, comprising:

a disc to be pressed against the tips of a plurality of wheel-mounting hub bolts provided on the wheel hub;

a disc rotating device for rotating the disc integrally with the wheel hub;

a plurality of displacement measuring devices for measuring displacements of a side face of the disc while the disc is rotating; and an inclination angle calculating device for calculating an inclination angle of the wheel hub on the basis of displacement signals from the displacement measuring devices.

5. An apparatus for measuring a wheel alignment before a wheel is fitted to a wheel hub of a vehicle body, comprising:

a wheel hub rotating device for rotating the wheel hub;

a plurality of displacement measuring devices, disposed facing the tips of a plurality of wheel-mounting hub bolts provided on the wheel hub, for measuring displacements of the tips of the hub bolts while the wheel hub is rotated; and an inclination angle calculating device for calculating an inclination angle of the wheel hub on the basis of displacement signals from the displacement measuring devices.

* * * * *